US012250577B2

(12) United States Patent
Fu

(10) Patent No.: US 12,250,577 B2
(45) Date of Patent: Mar. 11, 2025

(54) CELL MEASUREMENT METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Zhe Fu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 449 days.

(21) Appl. No.: 17/730,158

(22) Filed: Apr. 26, 2022

(65) Prior Publication Data

US 2022/0353714 A1 Nov. 3, 2022

Related U.S. Application Data

(63) Continuation of application No. PCT/CN2019/115144, filed on Nov. 1, 2019.

(51) Int. Cl.
*H04W 24/08* (2009.01)
*H04W 24/10* (2009.01)

(52) U.S. Cl.
CPC .......... *H04W 24/08* (2013.01); *H04W 24/10* (2013.01)

(58) Field of Classification Search
None
See application file for complete search history.

(56) References Cited

U.S. PATENT DOCUMENTS

2019/0253906 A1* 8/2019 Lin .......... H04W 24/10
2019/0306734 A1* 10/2019 Huang .......... H04W 24/08
2022/0046455 A1* 2/2022 Takada .......... H04W 36/0088

FOREIGN PATENT DOCUMENTS

CN 102595450 7/2012
CN 109041106 12/2018
WO 2019160266 8/2019
WO 2019193125 10/2019

OTHER PUBLICATIONS

EPO, Extended European Search Report for EP Application No. 19951215.3, Oct. 11, 2022.
CATT, "Measurement Issues for NTN Systems," 3GPP TSG-RAN WG2 Meeting #107bis, Oct. 14-18, 2019, R2-191257.
ZTE Corporation et al., "Clarification on SSB-ToMeasure bitmap in SMTC configuration," 3GPP TSG-RAN WG2 Meeting #101, R2-1802023, Feb. 2018.
WIPO, International Search Report and Written Opinion for PCT/CN2019/115144, Jul. 22, 2020.
CATT, "Measurement Issues for NTN Systems," R2-1912157, 3GPP TSG-RAN WG2 Meeting #107bis, Oct. 14-18, 2019.

* cited by examiner

*Primary Examiner* — Diane L Lo
(74) *Attorney, Agent, or Firm* — Hodgson Russ LLP

(57) ABSTRACT

The embodiments of the present application relate to a cell measurement method, a terminal device, and a network device, and can ensure the effective execution of cell measurement. The cell measurement method comprises: a terminal device acquires a target start time of a synchronisation block measurement timing configuration SMTC for a cell list and/or a target start time of the measurement interval; and, on the basis of the target start time of the SMTC and/or the target start time of the measurement interval, the terminal device measures at least one cell in the cell list.

19 Claims, 4 Drawing Sheets

CELL MEASUREMENT METHOD, TERMINAL DEVICE, AND NETWORK DEVICE

CROSS-REFERENCE TO RELATED APPLICATION

This application is a continuation of International Application No. PCT/CN2019/115144, filed Nov. 1, 2019, the entire disclosure of which is incorporated herein by reference.

TECHNICAL FIELD

The present application relates to the field of communications, and in particular, to a method for cell measurement, a terminal device, and a network device.

BACKGROUND

Currently, the 3rd Generation Partnership Project (3GPP) is studying the technology of Non-Terrestrial Network (NTN), and NTN generally provides communication services to terrestrial users by means of satellite communication.

In order to enable the terminal device to switch to the target cell faster, the terminal device needs to measure the target cell, so as to switch to the target cell that meets the condition. Therefore, how the terminal device measures the target cell in the NTN is an urgent problem to be solved.

SUMMARY

The embodiments of the present application provide a method for cell measurement, a terminal device, and a network device, which can ensure effective execution of cell measurement.

In a first aspect, there is provided a method for cell measurement, including: obtaining, by a terminal device, a target start time of a Synchronization signal Block Measurement Timing Configuration (SMTC) and/or a target start time of a measurement gap for a cell list; and measuring, by the terminal device, at least one cell in the cell list based on the target start time of the SMTC and/or the target start time of the measurement gap.

In a second aspect, there is provided a method for cell measurement, including: determining, by a network device, a target start time of a Synchronization signal Block Measurement Timing Configuration (SMTC) and/or a target start time of a measurement gap for a cell list; and sending, by the network device, Radio Resource Control (RRC) configuration measurement information to a terminal device, where the RRC measurement configuration information includes the cell list, and includes the target start time of the SMTC and/or a start time of the measurement gap.

In a third aspect, there is provided a terminal device for executing the method in the above-mentioned first aspect or each implementation manner thereof.

Specifically, the terminal device includes a functional module for executing the method in the above-mentioned first aspect or each implementation manner thereof.

In a fourth aspect, there is provided a network device for executing the method in the above-mentioned second aspect or each implementation manner thereof.

Specifically, the network device includes a functional module for executing the method in the above-mentioned second aspect or each implementation manner thereof.

In a fifth aspect, there is provided a terminal device, including a processor and a memory. The memory is used for storing a computer program, and the processor is used for calling and running the computer program stored in the memory to execute the method in the above-mentioned first aspect or each implementation manner thereof.

In a sixth aspect, there is provided a network device, including a processor and a memory. The memory is used for storing a computer program, and the processor is used for calling and running the computer program stored in the memory to execute the method in the above-mentioned second aspect or each implementation manner thereof.

In a seventh aspect, there is provided an apparatus for implementing the method according to any one of the above-mentioned first to second aspects or each implementation manner thereof.

Specifically, the apparatus includes: a processor for calling and running a computer program from a memory, so that a device installed with the apparatus executes the method according to any one of the above-mentioned first to second aspects or each implementation manner thereof.

Optionally, the apparatus is a chip.

In an eighth aspect, there is provided a computer-readable storage medium for storing a computer program, and the computer program causes a computer to execute the method according to any one of the above-mentioned first to second aspects or each implementation manner thereof.

In a ninth aspect, there is provided a computer program product, including computer program instructions, and the computer program instructions cause a computer to execute the method according to any one of the above-mentioned first to second aspects or each implementation manner thereof.

In a tenth aspect, there is provided a computer program which, when run on a computer, causes the computer to execute the method according to any one of the above-mentioned first to second aspects or each implementation manner thereof.

In the above technical solutions, the terminal device obtains the target start time of the SMTC and/or the target start time of the measurement gap for the cell list, and the target start time of the SMTC and/or the target start time of the measurement gap are aimed at the cell list, so that the terminal device can start the measurement gap and receive the reference signal of at least one cell in the cell list at a suitable time point, thereby ensuring the effective execution of cell measurement.

DETAILED DESCRIPTION

The technical solutions in the embodiments of the present application will be described below with reference to the accompanying drawings in the embodiments of the present application. Obviously, the described embodiments are part of the embodiments of the present application, not all of the embodiments. Based on the embodiments in the present application, all other embodiments obtained by those of ordinary skill in the art without creative efforts shall fall within the protection scope of the present application.

The technical solutions of the embodiments of the present application may be applied to various communication systems, for example, a Global System of Mobile communication (GSM) system, a Code Division Multiple Access (CDMA) system, a Wideband Code Division Multiple Access (WCDMA) system, General Packet Radio Service (GPRS), a Long Term Evolution (LTE) system, an LTE Frequency Division Duplex (FDD) system, an LTE Time Division Duplex (TDD), an Advanced Long Term Evolution (LTE-A) system, a New Radio (NR) system, an evolution system of NR system, an LTE-based access to unlicensed spectrum (LTE-U) system, an NR-based access to unlicensed spectrum (NR-U) system, a Universal Mobile Telecommunication System (UMTS), a Worldwide Interoperability for Microwave Access (WiMAX) communication system, a Wireless Local Area Networks (WLAN), Wireless Fidelity (WiFi), a next-generation communication system or other communication systems, etc.

Figure 1:
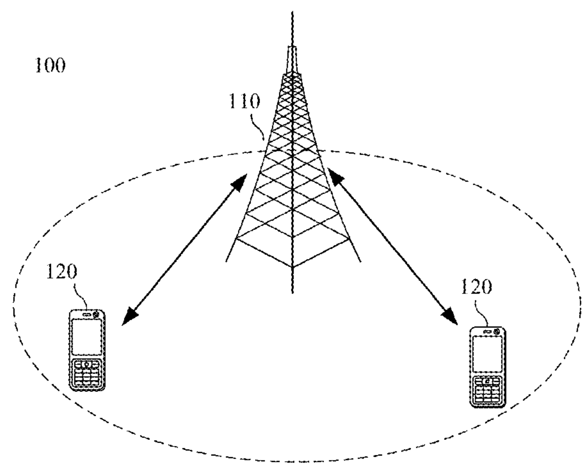
FIG. 1 is a schematic diagram of a communication system architecture according to an embodiment of the present application.

Exemplarily, a communication system 100 to which the embodiments of the present application are applied is shown in FIG. 1. The communication system 100 may include a network device 110, and the network device 110 may be a device that communicates with a terminal device 120 (or referred to as a communication terminal, a terminal). The network device 110 may provide communication coverage for a particular geographic area, and may communicate with the terminal device(s) located within the coverage area. Optionally, the network device 110 may be a base station (Base Transceiver Station, BTS) in a GSM system or a CDMA system, or a base station (NodeB, NB) in a WCDMA system, or an evolved base station (Evolutional Node B, eNB or eNodeB) in an LTE system, or a wireless controller in a Cloud Radio Access Network (CRAN), or the network device may be a mobile switching center, a relay station, an access point, an on-board equipment, a wearable device, a hub, a switch, a bridge, a router, a network-side device in 5G networks, or a network device in the future evolved Public Land Mobile Network (PLMN), etc.

The communication system 100 also includes at least one terminal device 120 located within the coverage area of the network device 110. As used herein, the "terminal device" includes, but is not limited to, connection via wired lines, such as connection via Public Switched Telephone Networks (PSTN), Digital Subscriber Line (DSL), digital cables, and direct cables; and/or another data connection/network; and/or via a wireless interface, such as for cellular networks, Wireless Local Area Networks (WLAN), digital TV networks such as DVB-H networks, satellite networks, AM-FM broadcast transmitter; and/or an apparatus of another terminal device that is set to receive/send communication signals; and/or Internet of Things (IoT) device. The terminal device set to communicate through a wireless interface may be referred to as a "wireless communication terminal", a "wireless terminal" or a "mobile terminal". Examples of the mobile terminals include, but are not limited to, satellite or cellular phones; Personal Communications System (PCS) terminals that can combine cellular radio phones with data processing, fax, and data communication capabilities; may include radio phones, pagers, Internet/intranet access, Web browser, memo pad, calendar, and/or PDA of Global Positioning System (GPS) receiver; and conventional laptop and/or palmtop receivers or other electronic apparatuses including radio telephone transceivers. The terminal device may refer to an access terminal, user equipment (UE), a user unit, a user station, a mobile station, a mobile, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), and a handheld device with wireless communication function, a computing device or other processing devices connected to a wireless modem, an in-vehicle device, a wearable device, a terminal device in 5G networks, or a terminal device in the future evolution of PLMN, etc.

Optionally, Device to Device (D2D) communication may be performed between the terminal devices 120.

Optionally, the 5G system or 5G network may also be referred to as a New Radio (NR) system or an NR network.

FIG. 1 exemplarily shows one network device and two terminal devices. Optionally, the communication system 100 may include a plurality of network devices and the coverage of each network device may include other numbers of terminal devices, which is not limited in the embodiments of the present application.

Optionally, the communication system 100 may also include other network entities such as a network controller and a mobility management entity, which is not limited in the embodiments of the present application.

It should be understood that a device with a communication function in the network/system in the embodiments of the present application may be referred to as a communication device. Taking the communication system 100 shown in FIG. 1 as an example, the communication device may include a network device 110 and a terminal device 120 with a communication function. The network device 110 and the terminal device 120 may be the specific devices described above, which will not be repeated here. The communication device may also include other devices in the communication system 100, such as the network controller, the mobility management entity, and other network entities, which are not limited in the embodiments of the present application.

It should also be understood that the communication system 100 shown in FIG. 1 may also be an NTN system, that is, the network device 110 in FIG. 1 may be a satellite.

It should be understood that the terms "system" and "network" are often used interchangeably herein.

In order to facilitate the understanding of the embodiments of the present application, several terms are first introduced below.

I. Non-Terrestrial Network (NTN)

NTN technology generally uses satellite communication to provide communication services for terrestrial users. Compared with terrestrial cellular network communication, satellite communication has many unique advantages. First of all, satellite communication is not limited by the user's geographical area. For example, general terrestrial communication cannot cover areas such as oceans, mountains, and deserts. Due to the inability to set up communication equipment or the lack of communication coverage due to sparse population, normal communication cannot be carried out in these areas. While for satellite communication, since one satellite can cover a large ground, and the satellite can orbit around the earth, theoretically every corner of the earth can be covered by satellite communication. Secondly, satellite communication has great social value. Satellite communication can be covered at low cost in remote mountainous areas and poor and backward countries or regions, so that people in these regions can enjoy advanced voice communication and mobile Internet technologies, which is conducive to narrowing the digital divide with developed regions and promoting development in these areas. Again, the distance of satellite communication is long, and the cost of communication does not increase significantly when the communication distance increases. Finally, satellite communication has high stability and is not limited by natural disasters.

According to different orbital altitudes, communication satellites may be divided into Low-Earth Orbit (LEO) satellites, Medium-Earth Orbit (MEO) satellites, Geostationary Earth Orbit (GEO) satellites, High Elliptical Orbit (HEO) satellites, etc.

For example, the altitude range of LEO satellites is 500 km-1500 km, and the corresponding orbital period is about 1.5 hours-2 hours. The signal propagation delay of single-hop communication between users is generally less than 20 ms. The maximum satellite viewing time is 20 minutes. The signal propagation distance is short, the link loss is small, and the transmit power requirements of the user terminal are not high.

For another example, the orbital altitude of the GEO satellite is 35786 km, and the rotation period around the earth is 24 hours. The signal propagation delay of single-hop communication between users is generally 250 ms.

In order to ensure the coverage of satellites and improve the system capacity of the entire satellite communication system, satellites use multiple beams to cover the ground. One satellite may form dozens or even hundreds of beams to cover the ground; and one satellite beam may cover a ground area with a diameter of tens to hundreds of kilometers.

II. NR Measurement

The measurement mainly refers to the mobility measurement in a connected state. After the network device delivers the measurement configuration to the terminal device, the terminal device may measure a signal quality status of a neighboring cell according to a measurement object, reporting configuration and other parameters indicated in the measurement configuration, and feed back the measurement report information to the network device, such that the network device instructs the terminal device to perform cell handover or complete a relationship list of neighbor cells.

1. Measurement Configuration

In NR, the network device may send measurement configuration information to the terminal device in the connected state through Radio Resource Control (RRC) signaling (such as an RRC connection reconfiguration message). The terminal device may perform cell measurement, such as intra-frequency measurement, inter-frequency measurement or inter-system measurement, according to the received measurement configuration information. Afterwards, the terminal device may report the measurement result to the network device. The measurement configuration information may include the following contents:

(a) Measurement Object

For the intra-frequency measurement and the inter-frequency measurement, each measurement object indicates a time-frequency position to be measured and a subcarrier spacing of a reference signal. For the cell related to the measurement object, the network device may configure a list of cell offsets, a list of blacklisted cells, and a list of whitelisted cells.

For the inter-system measurement, each measurement object may correspond to a separate Evolved-Universal Mobile Telecommunications System Terrestrial Radio Access (E-UTRA) frequency point, and for cells related to the E-UTRA frequency point, the network may configure a list of cell offsets, a list of blacklisted cells, and a list of whitelisted cells.

The terminal device does not perform any operation on the cells in the list of blacklisted cells in an event evaluation and measurement report, and performs the event evaluation and measurement report on the cells in the list of whitelisted cells.

For each measurement frequency point, the network device may configure one synchronization block measurement timing configuration (SS/PBCH Block Measurement Timing Configuration, SMTC), which is used to indicate the time for the terminal device to receive the Synchronization Signal Block (SSB) on the neighboring cell corresponding to the frequency point. The SMTC configuration may include a period of the SMTC, a start time offset of the SMTC within one period, a duration of the SMTC, and so on.

It can be seen that SMTC is configured based on the frequency point. Based on the current standard, the maximum configurable duration of SMTC is 5 ms.

(b) Reporting Configuration

Each measurement object may correspond to one or more reporting configurations. The reporting configuration may include:

- reporting criteria: that is, a triggering condition for the terminal device to perform measurement reporting, where reporting may be periodically triggered or reporting may be triggered by event;
- reference signal (RS) type: RS used by the terminal device for beam and cell measurement may be SSB or Channel State Information Reference Signal (CSI-RS);
- reporting format: the measurement reporting amount of the terminal device for each cell and each beam, such as Reference Signal Received Power (RSRP), may also include other related information, such as a maximum number of cells reported by the terminal device and a maximum number of beams reported for each cell.

Currently, the measurement events supported in NR may include the following:

- event A1: the signal quality of the serving cell is higher than one threshold;
- event A2: the signal quality of the serving cell is lower than one threshold;
- event A3: the signal quality of the neighboring cell is higher than the signal quality of the Special Cell (SpCell) serving cell by one threshold;
- event A4: the signal quality of the neighboring cell is higher than one threshold;

event A5: the signal quality of SpCell is lower than one threshold 1, and the signal quality of the neighboring cell is higher than one threshold 2;

event A6: the signal quality of the neighboring cell is higher than that of the Secondary Cell (SCell) by one threshold;

event B1: the signal quality of the neighboring cell of different standards (inter-RAT) is higher than one threshold;

event B2: the signal quality of the Primary Cell (PCell) is lower than one threshold 1, and the signal quality of the neighboring cell of inter-RAT is higher than one threshold 2.

(c) Measurement Identity

A separate ID may associate the measurement object with the reporting configuration. One measurement object may be associated with a plurality of reporting configurations at the same time, and one reporting configuration may also be associated with a plurality of measurement objects at the same time, which are distinguished by measurement identities.

(d) Measurement Gap

It is used to indicate the time for the terminal device to perform inter-frequency or inter-system measurement. The terminal device performs the inter-frequency or inter-system measurements during the measurement gap. The measurement gap configuration may include a period of the measurement gap (Measurement Gap Repetition Period, MGRP), a start time of the measurement gap in one period (gap offset), a length of the measurement gap (Measurement Gap Length, MGL), and the like. Assuming that the length of the MGL is 6*ms*, it means that the terminal device needs to perform the inter-frequency measurement within the 6 ms. If the value of MGRP is 40 ms, it means that the measurement gap occurs every 40 ms.

Currently, the measurement gap is configured based on the terminal device, that is, the measurement gap is a configuration using the terminal device as a granularity. Based on the current standard, the length of the measurement gap may be configured to a maximum value of 6 ms.

Table 1 shows a case of a configuration of the measurement gap.

TABLE 1

| Measurement gap identity | MGL(ms) | MGRP(ms) |
|---|---|---|
| 0 | 6 | 40 |
| 1 | 6 | 80 |
| 2 | 3 | 40 |
| 3 | 3 | 80 |
| 4 | 6 | 20 |
| 5 | 6 | 160 |
| 6 | 4 | 20 |
| 7 | 4 | 40 |
| 8 | 4 | 80 |
| 9 | 4 | 160 |
| 10 | 3 | 20 |
| 11 | 3 | 160 |
| 12 | 5.5 | 20 |
| 13 | 5.5 | 40 |
| 14 | 5.5 | 80 |
| 15 | 5.5 | 160 |
| 16 | 3.5 | 20 |
| 17 | 3.5 | 40 |
| 18 | 3.5 | 80 |
| 19 | 3.5 | 160 |
| 20 | 1.5 | 20 |
| 21 | 1.5 | 40 |
| 22 | 1.5 | 80 |
| 23 | 1.5 | 160 |

2. Measurement Reporting

The terminal device may perform measurement according to the measurement configuration sent by the network device, and when a certain trigger condition is met, the terminal device may perform an evaluation of the measurement reporting. If the reporting condition is met, the terminal device fills in a measurement report and sends it to the network device in the measurement report.

Among them, the measurement reporting may be divided into the following three categories.

1) Event Triggered Reporting

Only when a measurement event entering threshold configured by the network device is met and it lasts for a period of time, the terminal device will be triggered to send the measurement report. The process ends after the measurement report is sent once. The reporting configuration corresponding to this criterion is as follows:

the trigger type is one of event A1-event A6, event B1-event B2, and a threshold parameter;

the number of reporting is 1;

no matter what the reporting interval is set to, the terminal device may ignore it.

2) Periodic Reporting

After the network device configures the measurement configuration, the terminal device performs measurement of the corresponding frequency points according to the configured content, and sends the measurement report according to the specified reporting period and reporting interval. The reporting configuration corresponding to this criterion is as follows:

the trigger period is “period”, including “reportCGI” and “reportStrongestCell”;

if the reporting purpose is “reportCGI”, the number of reporting is equal to 1; if the reporting purpose is “reportStrongestCell”, the number of reporting may be greater than 1;

once the terminal device is configured with the “reportCGI” purpose of reporting, T321 timer is started. In order for the network device to obtain the information required for creating a list of neighboring cells as soon as possible, if the terminal device has obtained the content required for reporting before the timer expires, the terminal device may stop T321 and initiate reporting in advance.

3) Event Triggered Periodic Reporting

The terminal device may trigger the sending of the measurement report only when the measurement event entering threshold configured by the network device is satisfied and it lasts for a period of time. After the reporting is triggered, the timer between multiple measurements and the counter for measuring number of times may be started, and the process ends when the number of reporting reaches the requirement. The reporting configuration corresponding to this criterion is as follows:

the trigger type is one measurement event in event A1-event A5 and a threshold parameter;

the number of reporting is greater than 1;

the reporting interval is valid, and the network device sets the reporting period timer according to the configured reporting interval parameter.

The embodiment of the present application proposes a method for cell measurement, which can ensure effective execution of cell measurement.

Figure 2:
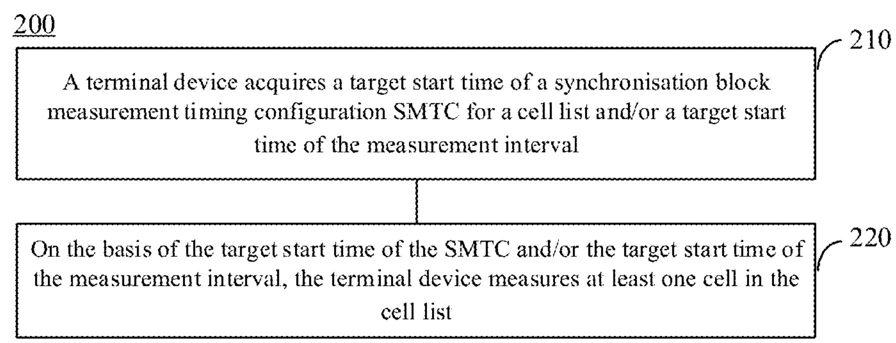
FIG. 2 is a schematic diagram of a method for cell measurement according to an embodiment of the present application.

FIG. 2 is a schematic diagram of a method 200 for cell measurement according to an embodiment of the present application. The method shown in FIG. 2 may be executed by a terminal device, for example, the terminal device may be the terminal device 120 shown in FIG. 1. As shown in FIG. 2, the method 200 may include at least some of the following contents.

It should be understood that the embodiments of the present application may be applied to NTN. The embodiments of the present application may also be applied to communication scenarios other than NTN, such as terrestrial cellular network communication, vehicle networking communication, etc.

In 210, the terminal device obtains a target start time of SMTC and/or a target start time of a measurement gap for a cell list.

In 220, the terminal device measures at least one cell in the cell list based on the target start time of the SMTC and/or the target start time of the measurement gap.

It should be understood that the term "and/or" in the present disclosure is only an association relationship for describing associated objects, indicating that there may be three kinds of relationships. For example, A and/or B may mean the following three conditions: A exists alone, A and B exist at the same time, and B exists alone. In addition, the character "/" in the present disclosure generally indicates that the related objects are in an "or" relationship.

It should also be understood that the name of the start time is not limited in the embodiments of the present application, that is, the start time may also be expressed by other names. For example, the start time may also be expressed as a time offset.

Optionally, in the embodiment of the present application, the target start time of the SMTC and/or the target start time of the measurement gap obtained by the terminal device may be not only for the cell list, but also for the specific cell, or, it may be for a cell under a frequency point or under a specific frequency point. Correspondingly, the terminal device may determine the corresponding identity or identity list by itself, or the network device may indicate the corresponding identity or identity list. For example, the network device may indicate the cell identity to the terminal device. Specifically, the terminal device only performs the measurement on the corresponding cell/frequency point/cell list/frequency point list within a range of the target start time of the SMTC and/or the target start time of the measurement gap, or the target time of the SMTC and/or the target time of the measurement gap, or the target position of the SMTC and/or the target position of the measurement gap, or the target start position of the SMTC and/or the target start position of the measurement gap that are determined for a certain object.

It should be understood that, in the embodiment of the present application, the target start time may be equivalent to the target start position, and the target time may be equivalent to the target position.

Optionally, the target start time may be the start time of the first point, or may be the start time of each point.

SMTC may be periodic or aperiodic. Similar to SMTC, the measurement gap may also be periodic or aperiodic. Especially for scenarios where the SMTC and/or the measurement gap are aperiodic, the network device may indicate the corresponding SMTC location and/or the measurement gap location to the terminal by means of a pattern or a location bitmap, or the terminal device may determine the pattern or location bitmap corresponding to the SMTC location and/or the measurement gap location by itself. For a scenario where the SMTC and/or the measurement gap are periodic, the location of the SMTC and/or the location of the measurement gap may be determined according to a pattern or a location bitmap, or the location of the SMTC and/or the location of the measurement gap may be determined by periodic configuration.

Optionally, when the cell list includes a plurality of cells, the plurality of cells may belong to the same set of cells, or may belong to different sets of cells.

Optionally, when the cell list includes a plurality of cells, the plurality of cells may belong to the same frequency point or set of frequency points, or may belong to different frequency points or sets of frequency points.

Optionally, the cell list and/or the frequency point list may include at least one cell or frequency point.

As an example, the set of cells may be divided according to a difference between a signal transmission delay between the terminal device and the base station of the neighboring cell and a signal transmission delay between the terminal device and the base station of the serving cell. For example, the cell(s) with the difference in a range of TH1 to TH2 belongs to the set of cells 1, and the cell(s) with the difference in a range of TH2 to TH3 belongs to the set of cells 2.

As another example, the set of cells may be divided based on the frequency points. For example, the cell(s) under the same frequency point belongs to the same set of cells. For another example, each cell under one frequency point may be one set of cells.

As another example, the set of cells may be divided based on the frequency points and based on the difference between the signal transmission delay between the terminal device and the base station of the neighboring cell and the signal transmission delay between the terminal device and the base station of the serving cell. For example, cells under the same frequency point and with a delay difference within a certain range are one set of cells.

As another example, the set of cells may be divided based on the frequency points and based on the difference between a path loss between the terminal device and the base station of the neighboring cell and a path loss between the terminal device and the base station of the serving cell. For example, cells under the same frequency point and with the path loss difference within a certain range are one set of cells.

As another example, the set of cells may be divided based on the difference between the path loss between the terminal device and the base station of the neighboring cell and the path loss between the terminal device and the base station of the serving cell. For example, cells with a path loss difference within a certain range are one set of cells.

As another example, the set of cells may be divided based on satellite distribution areas or ranges. For example, cells of satellites in the same area or range belong to the same set of cells. For another example, the cells of the satellites in the area or range within the same threshold belong to the same set of cells. For another example, some cells of the satellite in the area or range within the same threshold belong to the same set of cells.

As another example, the set of cells may be divided based on satellite identities. For example, cells belonging to the same satellite belong to the same set of cells. For another example, cells or part of cells belonging to a satellite with a specific identity belong to the same set of cells.

There are two manners for the terminal device to obtain the target start time of the SMTC and/or the target start time of the measurement gap for the cell list, which will be introduced separately below.

First Manner

The terminal device may determine the target start time of the SMTC and/or the target start time of the measurement gap based on an indication of the network device.

Specifically, the terminal device may receive RRC configuration measurement information sent by the network device. Optionally, the RRC configuration measurement information may include a cell list, and include the target start time of SMTC and/or the target start time of measurement gap.

Optionally, the RRC configuration measurement information may include a cell list, and include a target time of SMTC and/or a target time of measurement gap. At this time, the RRC configuration measurement information may include not only the target start time of the SMTC and/or the target start time of the measurement gap, but also the target end time of the SMTC and/or the target end time of the measurement gap.

Optionally, the RRC configuration measurement information may include a cell list, and include a target time of SMTC and/or a target time of measurement gap. At this time, the RRC configuration measurement information may include not only the target start time of the SMTC and/or the target start time of the measurement gap, but also the target length of the SMTC and/or the target length of the measurement gap.

Optionally, the cell list may only contain the identity of one cell, or may contain the identities of a plurality of cells. That is, the RRC configuration measurement information may be for one cell, or may be for one list of cells (cell list).

The RRC configuration measurement information may indicate the target start time of the SMTC and/or the target start time of the measurement gap to the terminal device by means of a pattern or a location bitmap. Alternatively, the RRC configuration measurement information may indicate the target time of SMTC and/or the target time of the measurement gap to the terminal device in the form of a pattern or a location bitmap. For example, the target start time of the SMTC configured by the network device may be SMTC pattern or SMTC location bitmap; the target start time of the measurement gap configured by the network device may be measurement gap pattern or measurement gap location bitmap.

Optionally, the network device may determine the SMTC pattern and/or the measurement gap pattern corresponding to each neighboring cell of the terminal device in the cell list according to the satellite ephemeris information and the position of the terminal device. The satellite ephemeris information may be the movement track of the satellite.

Optionally, the RRC configuration measurement information may further include related parameters of cell measurement. Specifically, the RRC configuration measurement information may include:

(a) at least one measurement object, where each measurement object in the at least one measurement object may be a carrier frequency point of the same frequency (intra-frequency carrier frequency point), or a carrier frequency point of different frequencies (inter-frequency carrier frequency point), or a carrier frequency point of inter-RAT (Radio Access Technology);

(b) for each measurement object, a list of blacklisted cells and a list of whitelisted cells related to the carrier frequency configured by the network device.

After receiving the RRC configuration measurement information sent by the network device, the terminal device may determine the target start time of SMTC and/or the target start time of measurement gap, or the terminal device may determine the target time of SMTC and/or the target time of measurement gap.

The network device may be a base station of a serving cell or an Operation Administration and Maintenance (OAM) system, or a satellite.

Before the network device sends the RRC configuration measurement information to the terminal device, the network device may determine the target start time of the SMTC and/or the target start time of the measurement gap, or determine the target time of the SMTC and/or the target time of the measurement gap. In the following, description will be given by taking the determination of the target start time of the SMTC and/or the target start time of the gap measurement by the network device as an example.

For the conventional terrestrial cellular system, the coverage radius of the cell is small, and the signal transmission delay between the terminal device and the base station of the serving cell and the signal transmission delay between the terminal device and the base station of the neighboring cell are very small. Therefore, the network device may set the start time offset of SMTC to 0. For example, the network device sends SSB at the $1^{st}$ ms, and the start time of SMTC is also the $1^{st}$ ms. By configuring the duration of SMTC to compensate for the difference in signal transmission delays between the terminal device and the base stations of different cells, it can be ensured that the terminal device receives the SSBs of different cells within the duration of the SMTC. Similarly, the network device may set the start time offset of the measurement gap to 0, and configure the length of the measurement gap to ensure that the measurement of the terminal device on all inter-frequency or inter-RAT frequency points is within the measurement gap.

Compared with the cellular network used in conventional NR, the signal transmission delay between the terminal device and the satellite in NTN is greatly increased. In addition, due to the large coverage of satellites, the signal transmission delays between terminal device and different satellites are also quite different. If the measurement configuration scheme of the current terrestrial NR system is completely used in the NTN system without making up for the relatively large signal transmission delay between the terminal device and the base stations of different cells, the problem of failing to find a suitable handover cell or provide a reasonable neighbor relationship may be occurred, and eventually the terminal device may fail to switch to a suitable cell, resulting in poor performance of the terminal device or even network drop.

In view of this, the network device may determine, according to the difference between the signal transmission delay between the terminal device and the base station of the neighboring cell and the signal transmission delay between the terminal device and the base station of the serving cell, the target start time of the SMTC and/or the target start time of the measurement gap for the terminal device to measure at least one cell in the cell list.

For the convenience of description, the following will take the first cell in the cell list as an example for description, but the present application is not limited thereto.

The network device may determine, according to a first difference, the target start time of the SMTC and/or the target start time of the measurement gap for the terminal device to measure the first cell. The cell list includes the first cell, and the first difference is a difference between the signal transmission delay between the terminal device and the base station of the first cell and the signal transmission delay between the terminal device and the base station of the serving cell.

In this way, the terminal device can start the cell measurement and receive the reference signal of the neighboring cell at an appropriate time point, which ensures the effective execution of the cell measurement.

In an implementation manner, the network device may determine, according to the first difference and a basic start time of the measurement gap, the target start time of the measurement gap for the terminal device to measure the first cell; and/or the network device may determine, according to a basic start time of the SMTC and the first difference, the target start time of the SMTC for the terminal device to measure the first cell.

Exemplarily, the target start time of the measurement gap=basic start time of the measurement gap*(1+first difference/signal transmission delay between the terminal device and the base station of the serving cell).

For another example, the target start time of the measurement gap=basic start time of the measurement gap*(1−first difference/signal transmission delay between the terminal device and the base station of the serving cell).

Similar to the target start time of the measurement gap, for example, the target start time of SMTC=basic start time of SMTC*(1+first difference/signal transmission delay between the terminal device and the base station of a serving cell).

For another example, the target start time of SMTC=basic start time of SMTC*(1-first difference/signal transmission delay between the terminal device and the base station of the serving cell).

In another implementation manner, the network device may determine an offset according to the first difference, and then determine the target start time of the measurement gap for the terminal device to measure the first cell according to the basic start time of the measurement gap and the offset; and/or, the network device may determine, according to the basic start time of the SMTC and the offset, the target start time of the SMTC for the terminal device to measure the first cell.

Exemplarily, the target start time of the measurement gap=basic start time of the measurement gap+offset.

For another example, the target start time of the measurement gap=basic start time of the measurement gap−offset.

For another example, the target start time of the measurement gap=basic start time of the measurement gap+offset*constant.

For another example, the target start time of the measurement gap=basic start time of the measurement gap−offset*constant.

Similar to the target start time of the measurement gap, for example, the target start time of SMTC=basic start time of SMTC+offset.

For another example, the target start time of SMTC=basic start time of SMTC−offset.

For another example, the target start time of SMTC=basic start time of SMTC+offset*constant.

For another example, the target start time of SMTC=basic start time of SMTC−offset*constant.

It should be understood that for the SMTC and the measurement gap, the values of the offsets determined respectively may be the same or different, which are not specifically limited in the embodiment of the present application.

Optionally, the basic start time of the SMTC and the basic start time of the measurement gap may be the time when the network device sends the reference signal. For example, if the network device sends the SSB at the $1^{st}$ ms, the basic start time of the measurement gap is the $1^{st}$ ms.

Optionally, the basic start time of the SMTC and the basic start time of the gap measurement may be negotiated in advance by the network device and the terminal device.

Optionally, the basic start time of SMTC and the basic start time of measurement gap may be configured by the network device, and then the network device may send the basic start time of SMTC and the basic start time of measurement gap to the terminal device through RRC signaling.

The network device determining the offset according to the first difference may include: the network device determining a second difference according to a set of differences, and then according to a functional relationship between the difference and the offset and according to the second difference, determining the offset. The set of differences includes the difference between the first delay and the second delay, the first delay is at least one signal transmission delay between the terminal device and the base station of each neighboring cell in the set of cells, and the second delay is the signal transmission delay between the terminal device and the base station of a serving cell, the set of cells belongs to the cell list, and the set of cells includes the first cell.

As an example, the second difference may be an average value of all the differences in the set of differences.

As another example, the second difference may be an average value of the maximum value and the minimum value in the set of differences.

As another example, the second difference may be a value randomly selected in the set of differences.

As another example, the second difference may be the largest value in the set of differences.

As another example, the second difference may be the minimum value in the set of differences. The second difference is the minimum value in the set of differences, so that the measurement gap window and/or the SMTC window may cover all possible sending time of the RRC configuration measurement information of the neighboring cells in the set of cells.

As an example, the functional relationship between the difference and the offset may be: the difference being equal to the offset. In this case, offset=second difference.

As another example, the functional relationship between the difference and the offset may be: offset=2*difference. In this case, offset=2*second difference.

As another example, the functional relationship between the difference and the offset may be: offset=basic value*difference/signal transmission delay between the terminal device and the base station of the serving cell.

Optionally, the functional relationship between the difference and the offset may be fixed and preset on the network device by the protocol.

Second Manner

The terminal device itself determines the target start time of the SMTC and/or the target start time of the measurement gap. Specifically, the terminal device may determine the cell list, and based on the determined cell list, determine the target start time of the SMTC and/or the target start time of the measurement gap. Alternatively, the terminal device may determine the target time of the SMTC and/or the target time of the measurement gap based on the determined cell list.

In an implementation manner, the terminal device may determine, according to a first difference, the target start time of the SMTC and/or the target start time of the measurement gap for measuring the first cell.

The first difference may be determined by the terminal device itself, or may also be indicated to the terminal device by the network device. For example, the network device may indicate the first difference to the terminal device through RRC configuration measurement information.

Optionally, the terminal device may determine, according to the first difference and the basic start time of the measurement gap, the target start time of the measurement gap for the terminal device to measure the first cell; and/or, the network device may determine, according to the basic start time of the SMTC and the first difference, the target start time of the SMTC for the terminal device to measure the first cell.

Exemplarily, the target start time of the measurement gap=basic start time of the measurement gap*(1+first difference/signal transmission delay between the terminal device and the base station of the serving cell.

For another example, the target start time of the measurement gap=basic start time of the measurement gap*(1−first difference/signal transmission delay between the terminal device and the base station of the serving cell.

Similar to the target start time of the measurement gap, for example, the target start time of SMTC=basic start time of SMTC*(1+first difference/signal transmission delay between the terminal device and the base station of the serving cell.

For another example, the target start time of SMTC=basic start time of SMTC*(1-first difference/signal transmission delay between the terminal device and the base station of the serving cell.

In another implementation manner, the terminal device may determine, according to an offset, the target start time of the SMTC and/or the target start time of the measurement gap for measuring the first cell.

Before the terminal device determines the target start time of SMTC and/or the target start time of the measurement gap according to the offset, the terminal device may receive first information sent by the network device, where the first information is used to instruct the terminal device to determine the target start time of SMTC and/or the target start time of measurement gap based on the offset. After the terminal device receives the first information, the terminal device may determine that the target start time of the SMTC and/or the target start time of the measurement gap needs to be determined based on the offset.

Optionally, the method 200 may further include: the network device sending second information to the terminal device, where the second information is used to indicate that the terminal device needs to determine at least one of the following values: the first difference, the second difference and the offset.

After the terminal device receives the second information, in an implementation manner, the terminal device may determine the offset, and then determine the target start time of the measurement gap for measuring the first cell according to the basic start time of the measurement gap and offset; and/or, the terminal device may determine, according to the basic start time of the SMTC and the offset, the target start time of the SMTC for measuring the first cell.

Optionally, the terminal device may determine the offset according to the first difference. Specifically, the terminal device may determine the second difference according to the set of differences, and then determine the offset according to the functional relationship between the difference and the offset, and according to the second difference.

Optionally, the RRC configuration measurement information may include the second difference, and after receiving the RRC configuration measurement information, the terminal device may obtain the second difference. The terminal device may then determine the offset according to the functional relationship between the difference and the offset, and according to the second difference.

Optionally, the RRC configuration measurement information may include the offset.

It should be understood that the implementation manner of the terminal device determining the target start time of the SMTC and/or the target start time of the measurement gap by itself may refer to the description of the first manner, which is not repeated here for the sake of brevity.

In the embodiment of the present application, the method 200 may further include: the terminal device obtaining a target length of the SMTC and/or a target length of the measurement gap for the cell list. At this time, the terminal device may measure at least one cell in the cell list based on the target start time and the target length of the SMTC, and/or based on the target start time and the target length of the measurement gap. That is, the terminal device may measure at least one cell in the cell list based on the location of the SMTC and/or the location of the measurement gap.

Optionally, the length of the SMTC may also be referred to as the duration of the SMTC, and the length of the measurement gap may also be referred to as the duration of the measurement gap.

There are two manners for the terminal device to obtain the target length of the SMTC and/or the target length of the measurement gap for the cell list, which will be introduced separately below.

First Manner

The terminal device may determine the target length of the SMTC and/or the target length of the measurement gap based on the indication of the network device. Specifically, the terminal device may receive RRC configuration measurement information sent by the network device, where the RRC configuration measurement information may include a cell list, and include a target length of SMTC and/or a target length of the measurement gap.

Optionally, the RRC configuration measurement information may indicate the target length of the SMTC and/or the target length of the measurement gap to the terminal device by means of a pattern or a location bitmap.

Before the network device sends the RRC configuration measurement information to the terminal device, the network device may determine the target length of the SMTC and/or the target length of the measurement gap.

In an implementation manner, the network device may determine, according to the first difference and the basic length of the measurement gap, the target length of the measurement gap used by the terminal device to measure the first cell; and/or, the network device may determine, according to the basic length of the SMTC and the first difference, the target length of the SMTC for the terminal device to measure the first cell.

Exemplarily, the target length of the measurement gap=basic length of the measurement gap*(1+first difference/signal transmission delay between the terminal device and the base station of the serving cell.

For another example, the target length of the measurement gap=basic length of the measurement gap*(1−first difference/signal transmission delay between the terminal device and the base station of the serving cell.

Similar to the target length of the measurement gap, for example, the target length of SMTC=basic length of SMTC*(1+first difference/signal transmission delay between the terminal device and the base station of the serving cell.

For another example, the target length of SMTC=basic length of SMTC*(1−first difference/signal transmission delay between the terminal device and the base station of the serving cell.

In another implementation manner, the network device may determine a first length according to the first difference, and then, according to the basic length of the measurement gap and the first length, determine the target length of the measurement gap used by the terminal device to measure the first cell; and/or, the network device may determine, according to the basic length of the SMTC and the first length, the target length of the SMTC for the terminal device to measure the first cell.

Exemplarily, the target length of the measurement gap=the basic length of the measurement gap+the first time.

For another example, the target length of the measurement gap=the basic length of the measurement gap−the first time.

For another example, the target length of the measurement gap=the basic length of the measurement gap+the first time*constant.

For another example, the target length of the measurement gap=the basic length of the measurement gap−first time*constant.

Similar to the target length of the measurement gap, for example, the target length of the SMTC=the basic length of the SMTC+the first time.

For another example, the target length of SMTC=basic length of SMTC−first time.

For another example, the target length of SMTC=basic length of SMTC+first time*constant.

For another example, the target length of SMTC=basic length of SMTC−first time*constant.

Optionally, for the SMTC and the measurement gap, the respectively determined values of the first time may be the same or different, which are not specifically limited in the embodiment of the present application.

Optionally, the basic length of the SMTC and the basic length of the measurement gap may be negotiated in advance by the network device and the terminal device.

Optionally, the basic length of the SMTC and the basic length of the measurement gap may be pre-configured by the network device, and then the network device may send the basic length of the SMTC and the basic length of the measurement gap to the terminal device through RRC signaling.

The network device determining the first length according to the first difference may include: the network device determining a third difference according to a set of differences, and then determining the first length according to a functional relationship between the difference and the length, and according to the third difference.

As an example, the third difference may be an average value of all the differences in the set of differences.

As another example, the third difference may be an average value of a maximum value and a minimum value in the set of differences.

As another example, the third difference may be a value randomly selected in the set of differences.

As another example, the third difference may be the maximum value in the set of differences. The third difference is the maximum value in the set of differences, so that the measurement gap window and/or the SMTC window can cover all possible sending time of the RRC configuration measurement information of neighboring cells in the set of cells.

As another example, the third difference may be the minimum value in the set of differences.

As an example, the functional relationship between the difference and the length may be: the difference being equal to the length. In this case, the first length=the third difference.

As another example, the functional relationship between the difference and the length may be: length=2*difference. In this case, the first length=2*the third difference.

As another example, the functional relationship between the difference and the length may be: length=basic value*difference/signal transmission delay between the terminal device and the base station of the serving cell.

Optionally, the functional relationship between the difference and the length may be fixed and preset on the network device by a protocol.

Second Manner

The terminal device itself determines the target length of the SMTC and/or the target length of the measurement gap. Specifically, the terminal device may determine the cell list, and based on the determined cell list, determine the target length of the SMTC and/or the target length of the measurement gap.

In an implementation manner, the terminal device may determine, according to the first difference, the target length of the SMTC and/or the target length of the measurement gap for measuring the first cell.

In another implementation manner, the terminal device may determine, according to the first length, the target length of the SMTC and/or the target length of the measurement gap for measuring the first cell.

Before the terminal device determines the target length of the SMTC and/or the target length of the measurement gap according to the offset, the terminal device may receive first information sent by the network device, where the first information is used to instruct the terminal device to determine the target length of SMTC and/or the target length of the measurement gap based on the first length. After the terminal device receives the first information, the terminal device may determine that the target length of the SMTC and/or the target length of the measurement gap needs to be determined based on the first length.

Optionally, the method 200 may further include: the network device sending 200 information to the terminal device, where the second information is used to indicate that the terminal device needs to determine at least one of the following values: the first difference, the third difference and the first length.

After the terminal device receives the second information, in an implementation manner, the terminal device may determine the first length, and then determine the target length of the measurement gap for measuring the first cell according to the basic length of the measurement gap and the first length; and/or, the terminal device may determine the target length of the SMTC for measuring the first cell according to the basic length of the SMTC and the first length.

Optionally, the terminal device may determine the first length according to the first difference. Specifically, the terminal device may determine a third difference according to the set of differences, and then determine the first length according to the functional relationship between the difference and the length, and according to the third difference.

Optionally, the RRC configuration measurement information may include a third difference, and the terminal device may acquire the third difference after receiving the RRC configuration measurement information. The terminal device may then determine the first length according to the functional relationship between the difference and the length, and according to the third difference.

Optionally, the RRC configuration measurement information may include the first length.

It should be understood that for the implementation manner of determining the target length of the SMTC and/or the target length of the measurement gap by the terminal device according to the first difference, reference may be made to the description of the first manner, which is not repeated here for brevity.

In order to describe the solution more clearly, an exemplary description is given below with reference to two specific embodiments.

First Embodiment

In step 1: the terminal device receives RRC configuration measurement information sent by the network device, where the RRC configuration measurement information is used to configure measurement-related parameters. Specifically, the RRC configuration measurement information may be used to configure the following parameters.

a) At least one measurement object, where each measurement object in the at least one measurement object is one carrier frequency point of an intra-frequency/inter-frequency/inter-system.

b) For each measurement object, a list of blacklisted cells and a list of whitelisted cells associated with the carrier frequency.

c) For at least one cell of each measurement frequency point f, discrete SMTC locations within the first time or within a Repetition Period.

The first time may be X ms or X symbol. For example, the first time may be 5 ms.

Alternatively, the first time may be time that circulates periodically.

Optionally, the location of SMTC may include the target length and the target time of at least one SMTC. The location of the SMTC configured by the network device may be an SMTC pattern, or the location of the SMTC configured by the network device may be an SMTC location bitmap.

Optionally, the network device may determine, according to the satellite ephemeris information and the position of the terminal device, the SMTC pattern corresponding to each neighboring cell of the terminal device at the measurement frequency point f, and the like.

d) For at least one cell of each measurement frequency point f, the network device may configure discrete locations of the measurement gap within the first time or within the Repetition Period.

Optionally, the location of the measurement gap may include the target length and the target time of at least one measurement gap. The location of the measurement gap configured by the network device may be measurement gap pattern, or the location of the measurement gap configured by the network device may be measurement gap location bitmap.

Optionally, the network device may determine, according to the satellite ephemeris information and the position of the terminal device, a gap pattern corresponding to each neighboring cell of the terminal device at the measurement frequency f, and the like.

In step 2: according to the configuration of the network device, for each neighboring cell under the inter-frequency or inter-system measurement frequency f, the terminal device determines the location of the measurement gap according to the location of the measurement gap configured by the network device in step 1, such as measurement gap pattern.

In step 3: according to the configuration of the network device, for the neighboring cells under each frequency f, the terminal device determines the location of SMTC according to the location of the SMTC configured by the network device in step 1, such as SMTC pattern (which may further include a period of the SMTC pattern).

In step 4: for each neighboring cell under the intro-frequency frequency point f, the terminal device performs measurement on the neighboring cell according to the location of the SMTC determined in step 3.

In step 5: for each neighboring cell under the inter-frequency or inter-system frequency point f, the terminal device performs measurement on the neighboring cell according to the location of the measurement gap determined in step 2 and the SMTC determined in step 3.

Figure 3:
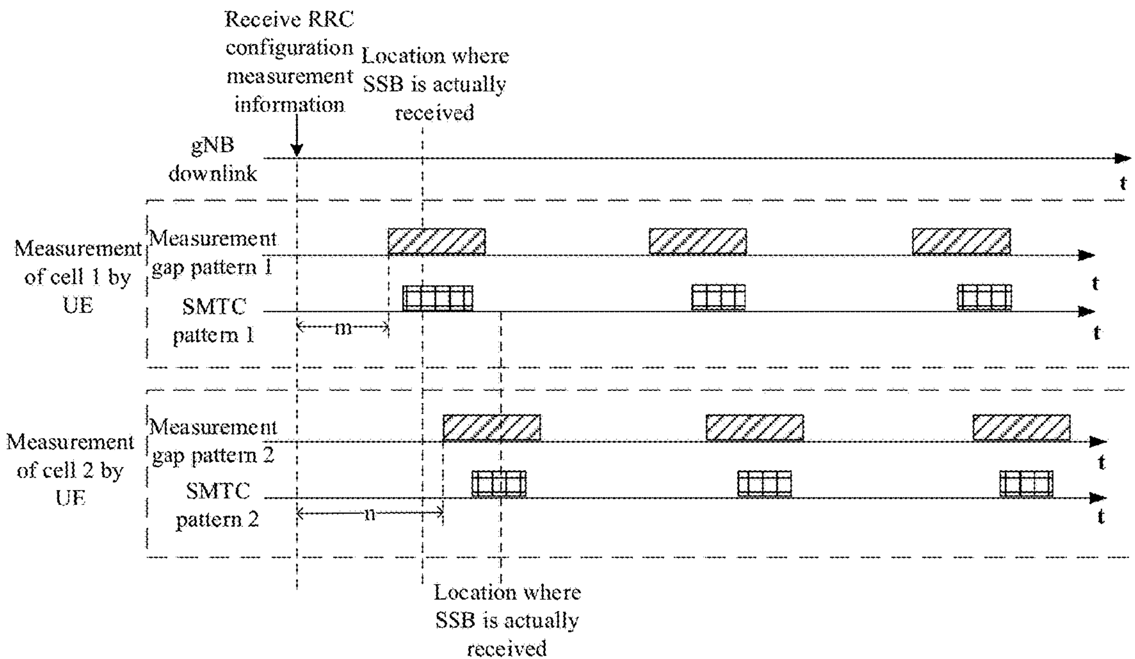
FIG. 3 is a schematic diagram of determining locations of a measurement gap and an SMTC according to an embodiment of the present application.

A specific schematic diagram of the first embodiment may be shown in FIG. 3. It is assumed that there are three NTN cells, namely cell 0, cell 1 and cell 2. The serving cell of the terminal device is cell 0, and cell 1 and cell 2 are two cells on the inter-frequency frequency point f. The base stations of the three NTN cells send SSB at the same time.

In step 1: the terminal device receives the measurement configuration from the base station of the serving cell, that is, the next generation base station (generation NodeB, gNB) 0, where the measurement configuration specifically includes the follows.

a) Measurement object configuration, instructing the terminal device to measure the neighboring cells on the inter-frequency frequency point f, that is, cell 1 and cell 2.

b) For cell 1, the network device configures SMTC pattern' and measurement gap pattern1. The SMTC pattern1 and the measurement gap pattern1 are used by the terminal device to determine the location of the SMTC and the location of the measurement gap for cell 1.

c) For cell 2, the network device configures SMTC pattern2 and measurement gap pattern2. The SMTC pattern2 and the measurement gap pattern2 are used by the terminal device to determine the location of the SMTC and the location of the measurement gap for cell 2.

In step 2: the terminal device determines the location of the measurement gap of the terminal device on the cell 1 according to the gap pattern1 configured by the network device. As can be seen from FIG. 3, the target start time of the measurement gap on cell 1 is m.

The terminal device determines the location of the measurement gap of the terminal device on cell 2 according to the measurement gap pattern2 configured by the network device. It can be seen from FIG. 3 that the target start time of the measurement gap on cell 2 is n.

In step 3: the terminal device determines the location of SMTC of the terminal device in cell 1 according to the SMTC pattern1 configured by the network device; and the terminal device determines the location of SMTC of the terminal device in cell 2 according to the SMTC pattern2 configured by the network device.

In step 4: for cell 1 and cell 2, the terminal device performs measurement on cell 1 and cell 2 according to the location of the measurement gap determined in step 2 and the location of the SMTC determined in step 3.

Second Embodiment

In step 1: the terminal device receives RRC configuration measurement information sent by the network device, where the RRC configuration measurement information is used to configure measurement-related parameters. Specifically, the RRC configuration measurement information may be used to configure the following parameters.

a) At least one measurement object, each measurement object in the at least one measurement object is a carrier frequency point of an intra-frequency/inter-frequency/inter-system.

b) For each measurement object, a list of blacklisted cells and a list of whitelisted cells associated with the carrier frequency.

c) Basic measurement gap information and basic SMTC information.

The basic measurement gap information may include the period of the measurement gap, the basic start time of the measurement gap, and the basic length of the measurement gap; and the basic SMTC information may include the period of the SMTC, the basic start time of the SMTC, and the basic length of the SMTC.

d) A measurement gap window configured for at least one set of cells, where the measurement gap window can cover all possible sending time of the RRC configuration measurement information of neighboring cells in the set of cells.

Specifically, the target start time of the measurement gap for the set of cells is: the basic start time of the measurement gap+the offset delta offset, where delta offset is a minimum value of a difference between a first delay and a second delay. The target length of the measurement gap for the set of cells is: the basic length of the measurement gap+a first length, where the first length is a maximum value of the difference between the first delay and the second delay.

e) SMTC window configured for at least one set of cells, where the SMTC window can cover the sending time of the RRC configuration measurement information of all possible neighboring cells in the set of cells.

Specifically, the target start time of SMTC for the set of cells is the basic start time of SMTC+delta offset. The target length of the SMTC for the set of cells is: the basic length of the SMTC+the first length.

It should be noted that, for at least one set of cells, the network device may also independently configure the corresponding measurement gap period and/or SMTC period.

In step 2: according to the configuration of the network device, the terminal device determines the measurement gap for each neighboring cell under the measurement frequency point f of the inter-frequency or inter-system in the following manner:

a) the measurement gap period: which is the period of the measurement gap configured by the network device for the terminal device in step 1;
b) the basic start time of the measurement gap (within one measurement gap period): which is the basic start time of the measurement gap configured by the network device in step 1;
c) the basic length of the measurement gap: which is the basic length of the measurement gap configured by the network device in step 1;
d) for at least one set of cells, determining the measurement gap period: which is the period of the measurement gap configured by the network device for the terminal device in step 1;
e) for at least one set of cells, determining the target start time of the measurement gap: the basic start time of the measurement gap+delta offset configured by the network device in step 1;
f) for at least one set of cells, determining the target length of the measurement gap: the basic length of the measurement gap+the first length configured by the network device in step 1.

In step 3: according to the configuration of the network device, the terminal device determines the SMTC for the neighboring cell under each frequency point f in the following manner:

a) for at least one set of cells, determining the SMTC period: which is the period of SMTC configured by the network device for the terminal device in step 1;
b) basic start time of SMTC (within one measurement gap period): which is the basic start time of SMTC configured by the network device in step 1;
c) basic length of SMTC: which is the basic length of SMTC configured by the network device in step 1;
d) for at least one set of cells, determining the target start time of SMTC: the basic start time of SMTC+delta offset configured by the network device in step 1;
e) for at least one set of cells, determining the target length of the SMTC: the basic length of the SMTC+the first length configured by the network device in step 1.

In step 4: for the neighboring cell under each intra-frequency frequency point f, the terminal device performs measurement on the neighboring cell according to the SMTC determined in step 3.

In step 5: for the neighboring cell under each inter-frequency or inter-system frequency point, the terminal device performs measurement on the neighboring cell according to the measurement gap determined in step 2 and the SMTC determined in step 3.

Figure 4:
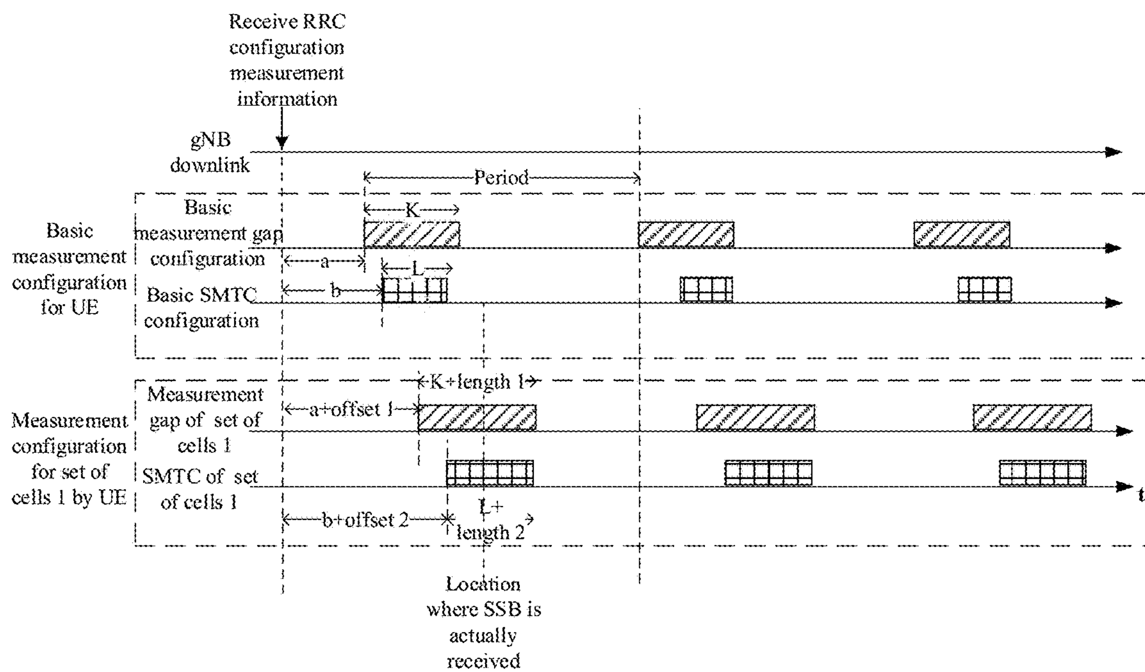
FIG. 4 is another schematic diagram of determining the locations of the measurement gap and the SMTC according to an embodiment of the present application.

A specific schematic diagram of the second embodiment may be shown in FIG. 4. It is assumed that there are three NTN cells, namely cell 0, cell 1 and cell 2. The serving cell of the terminal device is cell 0, and cell 1 and cell 2 are two cells on the inter-frequency frequency point f. The base stations of the three NTN cells send SSB at the same time.

In step 1: the terminal device receives the measurement configuration from the base station gNB 0 of the serving cell, where the measurement configuration specifically includes:

a) measurement object configuration, instructing the terminal device to measure the neighboring cells on the inter-frequency frequency point f, that is, cell 1 and cell 2;
b) basic measurement gap configuration, including period, basic start time a and basic length K;
c) basic SMTC configuration, including period, basic start time b, and basic length L;
d) since the network device considers that cell 1 and cell 2 belong to the same set of cells 1, a set of configured offset information for the measurement gap of set of cells 1 including: offset 1 and length 1;
e) since the network device considers that cell 1 and cell 2 belong to the same set of cells 1, a set of configured offset information for the SMTC of set of cells 1 including: offset 2 and length 2.

In step 3: the terminal device determines that cell 1 and cell 2 belong to the same set of cells 1 according to the configuration of the network device, and there is only one set of offset information, then the terminal device determines the measurement gap on cell 1 and cell 2 accordingly. As shown in FIG. 4, the target start time of the measurement gap is a+offset 1, and the target length is K+length 1.

In step 4: the terminal device determines that cell 1 and cell 2 belong to the same set of cells 1 according to the configuration of the network device, and there is only one set of offset information, then the terminal device determines the SMTC on cell 1 and cell 2 accordingly. As shown in FIG. 4, the target start time of SMTC is b+offset 2, and the target length is L+length 2.

In step 5: for cell 1 and cell 2, the terminal device performs measurement on cell 1 and cell 2 according to the measurement gap determined in step 3 and the SMTC determined in step 4.

During the cell measurement by the terminal device, the uplink and downlink data transmission between the terminal device and the serving cell may be interrupted. In order to reduce the communication interruption between the terminal device and the serving cell or achieve the purpose of energy saving, the RRC configuration measurement information sent by the network device to the terminal device may include the minimum measurement time and/or the minimum number of measurements within a specific time.

Optionally, the object of the minimum measurement time and/or the minimum number of measurements may be at least one cell in the cell list.

Optionally, the object of the minimum measurement time and/or the minimum number of measurements may be one or several specific cells, one or several indicated cells, or any cell.

Optionally, the object of the minimum measurement time and/or the minimum number of measurements may be at least one cell list.

Optionally, the object of the minimum measurement time and/or the minimum number of measurements may be at least one frequency point or at least one set of frequency points When the number of cell measurement performed by the terminal device meets the minimum number of measurements, and/or when the measurement time of the terminal device to perform cell measurement meets the minimum measurement time, the terminal device may stop cell measurement.

Further, the terminal device may send third information to the network device, where the third information is used to notify that the communication between the current serving cell and the terminal device has been resumed.

Exemplarily, the terminal device may send the third information to the terminal device by using any one of the following messages: a Random Access Channel (RACH), a Media Access Control (MAC) Control Element (CE), an RRC message or a physical layer message.

Optionally, the specific time may be a predefined time, or the first time may be a repetition period, or the first time may be N*repetition period. N may be indicated by the network device, or determined by the terminal device, or predefined.

It should be noted that the embodiment of the present application may be applied to a scenario where both the serving cell and the neighboring cell are GEO. At this time, the difference between the signal transmission delay between the terminal device and the base station of the neighboring cell and the signal transmission delay between the terminal device and the base station of the serving cell is basically unchanged. The embodiment of the present application may also be applied to a scenario where at least one of the serving cell and the neighboring cell is not GEO. At this time, the difference between the signal transmission delay between the terminal device and the base station of the neighboring cell and the signal transmission delay between the terminal device and the base station of the serving cell may change.

For the scenario where at least one of the serving cell and the neighboring cell is not GEO, the terminal device may measure the cell in one of the following manners.

First manner: the terminal device may determine an adjustment law of the location of the measurement gap and/or SMTC within the first time or within the Repetition period, that is, the adjustment law of the target start time and the target length of at least one measurement gap and/or SMTC, such as an adjustment period, an adjustment step, etc.

Second manner: the terminal device may determine the measurement gap/or SMTC window of at least one set of cells, and the measurement gap/or SMTC window can cover the adjustment law of possible sending time of the RRC configuration measurement information of neighboring cells in the set of cells, such as the adjustment period, and the adjustment step, etc.

In the embodiment of the present application, the target start time of the SMTC and/or the target start time of the measurement gap for the cell list obtained by the terminal device is with respect to the cell list, so that the terminal device can start the measurement gap and receive the reference signal of at least one cell in the cell list at a suitable time point, thereby ensuring the effective execution of cell measurement.

Figure 5:
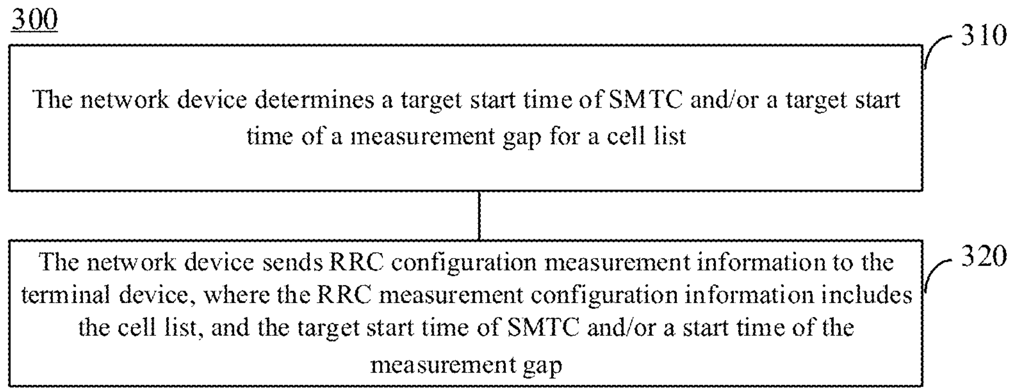
FIG. 5 is a schematic diagram of a method for cell measurement according to an embodiment of the present application.

FIG. 5 is a schematic diagram of a method 300 for cell measurement according to an embodiment of the present application. The method shown in FIG. 5 may be executed by a network device, and the terminal device may be, for example, the network device 110 shown in FIG. 1. As shown in FIG. 5, the method 300 may include at least some of the following contents.

In 310, the network device determines a target start time of SMTC and/or a target start time of a measurement gap for a cell list.

In 320, the network device sends RRC configuration measurement information to the terminal device, where the RRC measurement configuration information may include a cell list, and include the target start time of SMTC and/or the start time of the measurement gap.

Optionally, in the embodiment of the present application, the RRC configuration measurement information includes a cell list, and includes a target time of SMTC and/or a target time of the measurement gap.

Optionally, in the embodiment of the present application, the RRC configuration measurement information indicates the target start time of the SMTC and/or the start time of the measurement gap to the terminal device by means of a pattern or a bitmap location.

Optionally, in the embodiment of the present application, the network device determining the target start time of the SMTC and/or the target start time of the measurement gap for the cell list includes: the network device determining the target start time of the SMTC and/or the target start time of the measurement gap for the terminal device to measure a first cell according to a first difference.

Optionally, in the embodiment of the present application, the network device determining the target start time of the SMTC and/or the target start time of the measurement gap for the terminal device to measure the first cell according to the first difference, includes: the network device determining an offset according to the first difference; the network device determining the target start time of the measurement gap for measuring the first cell according to a basic start time of the measurement gap and the offset, and/or the terminal device determining the target start time of the SMTC for measuring the first cell according to the basic start time of the SMTC and the offset.

Optionally, in the embodiment of the present application, the target start time of the measurement gap is a sum of the basic start time of the measurement gap and the offset; and/or the target start time of SMTC is a sum of the basic start time of SMTC and the offset.

Optionally, in the embodiment of the present application, the network device determining the offset according to the first difference includes: the network device determining a second difference according to a set of differences; the network device determining the offset according to the functional relationship between the difference and the offset, and the second difference.

Optionally, in the embodiment of the present application, the second difference is the minimum value in the set of differences.

Optionally, in the embodiment of the present application, the method 300 may further include: the network device determining the target length of the SMTC and/or the target length of the measurement gap for the cell list, and the RRC configuration measurement information includes the target length of the SMTC and/or the target length of the measurement gap.

Optionally, in the embodiment of the present application, the RRC configuration measurement information indicates the target length of the SMTC and/or the target length of the measurement gap to the terminal device by means of a pattern or a bitmap location.

Optionally, in the embodiment of the present application, the network device determining the target length of the SMTC and/or the target length of the measurement gap for the cell list includes: the network device determining, according to the first difference, the target length of the SMTC and/or the target length of the measurement gap for the terminal device to measure the first cell.

Optionally, in the embodiment of the present application, the network device determining, according to the first difference, the target length of the SMTC and/or the target length of the measurement gap for the terminal device to measure the first cell, includes: the network device determining, according to the first difference, a first length; the network device determining the target length of the measurement gap for measuring the first cell according to the basic length of the measurement gap and the first length, and/or, the network device determining the target length of the SMTC for measuring the first cell according to the basic length of the SMTC and the first length.

Optionally, in the embodiment of the present application, the target length of the measurement gap is the sum of the basic length of the measurement gap and the first length; and/or the target length of the SMTC is the sum of the basic length of the SMTC and the first length.

Optionally, in the embodiment of the present application, the network device determining the first length according to the first difference includes: the network device determining the third difference according to the set of differences; the network device determining the first length according to a functional relationship between the difference and the length, and according to the third difference.

Optionally, in the embodiment of the present application, the third difference is the maximum value in the set of differences.

Optionally, in the embodiment of the present application, the RRC configuration measurement information includes the minimum measurement time and/or the minimum number of measurements for the terminal device to measure at least one cell in the cell list.

Optionally, in the embodiment of the present application, the method 300 further includes: the network device receiving third information sent by the terminal device, where the third information is used to notify that the communication between the base station of the serving cell and the terminal device has been resumed.

Optionally, in the embodiment of the present application, the method 300 is applied in NTN.

It should be understood that although the method 200 and the method 300 are described above, this does not mean that the method 200 and the method 300 are independent, and the descriptions of the respective methods may refer to each other. For example, relevant descriptions in method 200 may apply to method 300.

It should also be understood that, in the embodiments of the present application, "first", "second" and "third" are only used to distinguish different objects, but do not limit the scope of the embodiments of the present application.

The embodiments of the present application have been described in detail above with reference to the accompanying drawings. However, the present application is not limited to the specific details of the above-mentioned embodiments. Within the scope of the technical concept of the present application, various simple modifications can be made to the technical solutions of the present application. These simple modifications all belong to the protection scope of the present application.

For example, the specific technical features described in the above-mentioned specific embodiments can be combined in any suitable manner unless they are inconsistent. In order to avoid unnecessary repetition, the present application does not describe any possible combination manners.

For another example, the various embodiments of the present application can also be combined arbitrarily, as long as they do not violate the idea of the present application, and they should also be regarded as the content disclosed in the present application.

It should be understood that in the various method embodiments of the present application, the size of the sequence numbers of the above-mentioned processes does not mean the sequence of execution, and the execution sequence of each process should be determined by its functions and internal logic, and should not constitute any limitation on the implementation of the embodiments of the present application.

The communication methods according to the embodiments of the present application are described in detail above. The communication apparatuses according to the embodiments of the present application will be described below with reference to FIG. 6 to FIG. 8. The technical features described in the method embodiments are applicable to the following apparatus embodiments.

Figure 6:
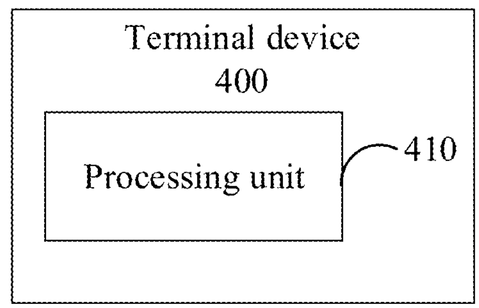
FIG. 6 is a schematic block diagram of a terminal device according to an embodiment of the present application.

FIG. 6 shows a schematic block diagram of a terminal device 400 according to an embodiment of the present application. As shown in FIG. 6, the terminal device 400 includes:

a processing unit 410, configured to obtain a target start time of an SMTC and/or a target start time of a measurement gap for a cell list.

The processing unit 410 is further configured to measure at least one cell in the cell list based on the target start time of the SMTC and/or the target start time of the measurement gap.

Optionally, in the embodiment of the present application, the terminal device 400 further includes:

a communication unit 420, configured to receive RRC configuration measurement information sent by a network device, where the RRC configuration measurement information includes the cell list, and includes the target start time of the SMTC and/or the start time of the measurement gap; or the RRC configuration measurement information includes the cell list, and includes the target time of the SMTC and/or the target time of the measurement gap.

Optionally, in the embodiment of the present application, the RRC configuration measurement information indicates the target start time of the SMTC and/or the start time of the measurement gap to the terminal device by means of a pattern or a bitmap location; or the RRC configuration measurement information indicates the target time of the SMTC and/or the target time of the measurement gap to the terminal device by means of a pattern or a bitmap location.

Optionally, in the embodiment of the present application, the processing unit 410 is specifically configured to: determine the cell list; determine, based on the cell list, the target start time of the SMTC and/or the target start time of the measurement gap, or, determine the target time of the SMTC and/or the target time of the measurement gap.

Optionally, in the embodiment of the present application, the processing unit 410 is specifically configured to: determine a first difference, where the first difference is the difference between the signal transmission delay between the terminal device and the base station of the first cell and the signal transmission delay between the terminal device and the base station of the serving cell; according to the first difference, determine the target start time of the SMTC and/or the target start time of the measurement gap for measuring the first cell, where the cell list includes the first cell.

Optionally, in the embodiment of the present application, the processing unit 410 is specifically configured to: determine an offset according to the first difference; according to the basic start time of the measurement gap and the offset, determine the target start time of the measurement gap for measuring the first cell, and/or, determine, by the terminal device, the target start time of the SMTC to measure the first cell according to the basic start time of the SMTC and the offset.

Optionally, in the embodiment of the present application, the target start time of the measurement gap is the sum of the basic start time of the measurement gap and the offset; and/or the target start time of the SMTC is the sum of the basic start time of the SMTC and the offset.

Optionally, in the embodiment of the present application, the processing unit 410 is specifically configured to: determine a second difference according to a set of differences, where the set of differences includes a difference between the first delay and the second delay, the first delay is at least one signal transmission delay between the terminal device and the base station of each neighboring cell in the set of cells, and the second delay is the signal transmission delay between the terminal device and the base station of the serving cell, the set of cells belongs to the cell list, and the set of cells includes the first cell; according to the functional relationship between the difference and the offset, and according to the second difference, determine the offset.

Optionally, in the embodiment of the present application, the second difference is the minimum value in the set of differences.

Optionally, in the embodiment of the present application, the terminal device 400 further includes: a communication unit 420, configured to receive RRC configuration measurement information sent by a network device, where the RRC configuration measurement information includes the first difference or the second difference or the offset.

Optionally, in the embodiment of the present application, the terminal device 400 further includes: a communication unit 420, configured to receive second information sent by the network device, where the second information is used to instruct the terminal device whether to determine at least one of the following values: the first difference, the second difference, and the offset.

Optionally, in the embodiment of the present application, the terminal device 400 further includes: a communication unit 420, configured to receive first information sent by a network device, where the first information is used to instruct the terminal device to determine the target start time of the SMTC and/or the target start time of the measurement gap based on the offset.

Optionally, in the embodiment of the present application, the processing unit 410 is further configured to: obtain the target length of the SMTC and/or the target length of the measurement gap for the cell list.

The processing unit 410 is specifically configured to: based on the target start time and target length of the SMTC, and/or, based on the target start time and target length of the measurement gap, perform measurement on at least one cell in the cell list.

Optionally, in the embodiment of the present application, the terminal device 400 further includes: a communication unit 420, configured to receive RRC configuration measurement information sent by a network device, where the RRC configuration measurement information includes the cell list, and includes the target length of the SMTC and/or the target length of the measurement gap.

Optionally, in the embodiment of the present application, the RRC configuration measurement information indicates the target length of the SMTC and/or the target length of the measurement gap to the terminal device by means of a pattern or a bitmap location.

Optionally, in the embodiment of the present application, the processing unit 410 is specifically configured to: determine the cell list; and determine the target length of the SMTC and/or the target length of the measurement gap based on the cell list.

Optionally, in the embodiment of the present application, the processing unit 410 is specifically configured to: determine a first difference, where the first difference is a difference between the signal transmission delay between the terminal device and the base station of the first cell the signal transmission delay between the terminal device and the base station of the serving cell; and according to the first difference, determine the target length of the SMTC and/or the target length of the measurement gap for measuring the first cell, where the cell list includes the first cell.

Optionally, in the embodiment of the present application, the processing unit 410 is specifically configured to: determine a first length according to the first difference; determine the target length of the measurement gap for measuring the first cell according to the basic length of the measurement gap and the first length, and/or determine, by the terminal device, the target length of the SMTC for measuring the first cell according to the basic length of the SMTC and the first length.

Optionally, in the embodiment of the present application, the target length of the measurement gap is the sum of the basic length of the measurement gap and the first length; and/or the target length of the SMTC is the sum of the basic length of the SMTC and the first length.

Optionally, in the embodiment of the present application, the processing unit 410 is specifically configured to: determine a third difference according to a set of differences, where the set of differences includes a difference between the first delay and the second delay value, the first delay is at least one signal transmission delay between the terminal device and the base station of each neighboring cell in the set of cells, and the second delay is the signal transmission delay between the terminal device and the base station of the serving cell, the set of cells belongs to the cell list, and the set of cells includes the first cell; according to the functional relationship between the difference and the length, and according to the third difference, determine the first length.

Optionally, in the embodiment of the present application, the third difference is the maximum value in the set of differences.

Optionally, in the embodiment of the present application, the terminal device 400 further includes: a communication unit 420, configured to receive RRC configuration measurement information sent by a network device, where the RRC configuration measurement information includes the first difference or the third difference or the first length.

Optionally, in the embodiment of the present application, the terminal device 400 further includes: a communication unit 420, configured to receive second information sent by the network device, where the second information is used to instruct the terminal device whether to determine at least one of the following values: the first difference, the third difference, and the first length.

Optionally, in the embodiment of the present application, the terminal device 400 further includes: a communication unit 420, configured to receive first information sent by the network device, where the first information is used to instruct the terminal device to determine the target length of the SMTC and/or the target length of the measurement gap based on the first length.

Optionally, in the embodiment of the present application, the terminal device 400 further includes: a communication unit 420, configured to receive RRC configuration measurement information sent by the network device, where the RRC configuration measurement information includes the shortest measurement time and/or the minimum number of measurements for the terminal device to perform measurement on at least one cell in the cell list.

The processing unit 410 is further configured to: when the measurement time for measuring at least one cell in the cell list satisfies the shortest measurement time, and/or when the number of measurements for the terminal device to perform measurement on at least one cell in the cell list satisfies the minimum number of measurements, stop the measurement of at least one cell in the cell list.

Optionally, in the embodiment of the present application, when the measurement time during which the terminal device measures at least one cell in the cell list satisfies the shortest measurement time, and/or when the number of measurements for the terminal device to measure at least one cell in the cell list satisfies the minimum number of measurements, the communication unit 420 is further configured to: send third information to the network device, where the third information is used to notify that the communication between the base station of the serving cell and the terminal device has been restored.

Optionally, in the embodiment of the present application, the terminal device 400 is in a non-terrestrial network (NTN).

It should be understood that the terminal device 400 may correspond to the terminal device in the method 200, and may implement the corresponding operations of the terminal device in the method 200, which will not be repeated here for brevity.

Figure 7:
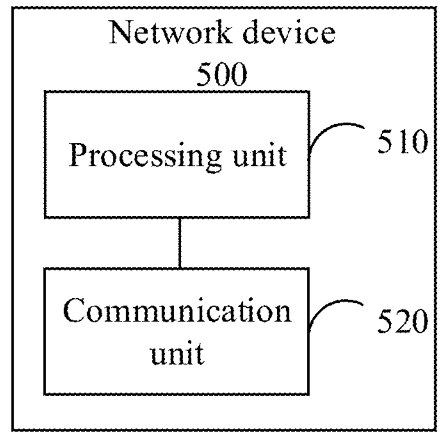
FIG. 7 is a schematic block diagram of a network device according to an embodiment of the present application.

FIG. 7 shows a schematic block diagram of a network device 500 according to an embodiment of the present application. As shown in FIG. 7, the network device 500 includes:

a processing unit 510, configured to determine a target start time of SMTC and/or a target start time of a measurement gap for a cell list; and a communication unit 520, configured to send Radio Resource Control (RRC) configuration measurement information to a terminal device, where the RRC measurement configuration information includes the cell list, and includes the target start time of the SMTC and/or a start time of the measurement gap.

Optionally, in the embodiment of the present application, the RRC configuration measurement information includes the cell list, and includes a target time of the SMTC and/or the target time of the measurement gap.

Optionally, in the embodiment of the present application, the RRC configuration measurement information indicates the target start time of the SMTC and/or the start time of the measurement gap to the terminal device by means of a pattern or a location bitmap.

Optionally, in the embodiment of the present application, the processing unit 510 is specifically configured to: determine, according to a first difference, the target start time of the SMTC and/or the target start time of the measurement gap for the terminal device to measure a first cell, the cell list includes the first cell, and the first difference is a difference between a signal transmission delay between the terminal device and a base station of the first cell and a signal transmission delay between the terminal device and a base station of a serving cell.

Optionally, in the embodiment of the present application, the processing unit 510 is specifically configured to: determine an offset according to the first difference; determine the target start time of the measurement gap for measuring the first cell according to a basic start time of the measurement gap and the offset, and/or determine, by the terminal device, the target start time of the SMTC to measure the first cell according to a basic start time of the SMTC and the offset.

Optionally, in the embodiment of the present application, the target start time of the measurement gap is a sum of the basic start time of the measurement gap and the offset; and/or the target start time of the SMTC is a sum of the basic start time of the SMTC and the offset.

Optionally, in the embodiment of the present application, the processing unit 510 is specifically configured to: determine a second difference according to a set of differences, where the set of differences includes a difference between a first delay and a second delay, the first delay is at least one signal transmission delay between the terminal device and the base station of each neighboring cell in the set of cells, and the second delay is a signal transmission delay between the terminal device and the base station of a serving cell, the set of cells belongs to the cell list, and the set of cells includes the first cell; according to a functional relationship between the difference and the offset, and according to the second difference, determine the offset.

Optionally, in the embodiment of the present application, the second difference is the minimum value in the set of differences.

Optionally, in the embodiment of the present application, the processing unit 510 is further configured to: determine a target length of the SMTC and/or a target length of the measurement gap for the cell list, where the RRC configuration measurement information includes the target length of the SMTC and/or the target length of the measurement gap.

Optionally, in the embodiment of the present application, the RRC configuration measurement information indicates the target length of the SMTC and/or the target length of the measurement gap to the terminal device by means of a pattern or a location bitmap.

Optionally, in the embodiment of the present application, the processing unit 510 is specifically configured to: determine, according to the first difference, the target length of the SMTC and/or the target length of the measurement gap for the terminal device to measure the first cell, where the cell list includes the first cell, and the first difference is a difference between a signal transmission delay between the terminal device and a base station of the first cell and a signal transmission delay between the terminal device and a base station of a serving cell.

Optionally, in the embodiment of the present application, the processing unit 510 is specifically configured to: determine a first length according to the first difference; determine the target length of the measurement gap for measuring the first cell according to a basic length of the measurement gap and the first length, and/or determine, the network device, the target length of the SMTC for measuring the first cell according to the basic length of the SMTC and the first length.

Optionally, in the embodiment of the present application, the target length of the measurement gap is the sum of the basic length of the measurement gap and the first length; and/or the target length of the SMTC is the sum of the basic length of the SMTC and the first length.

Optionally, in the embodiment of the present application, the processing unit 510 is specifically configured to: determine a third difference according to a set of differences, where the set of differences includes a difference between a first delay and a second delay, the first delay is at least one signal transmission delay between the terminal device and the base station of each neighboring cell in the set of cells, and the second delay is the signal transmission delay between the terminal device and the base station of a serving cell, the set of cells belongs to the cell list, and the set of cells includes the first cell; according to the functional relationship between the difference and the length, and according to the third difference, determine the first length.

Optionally, in the embodiment of the present application, the third difference is the maximum value in the set of differences.

Optionally, in the embodiment of the present application, the RRC configuration measurement information includes the shortest measurement time and/or the minimum number of measurements for the terminal device to measure at least one cell in the cell list.

Optionally, in the embodiment of the present application, the communication unit 520 is further configured to: receive third information sent by the terminal device, where the third information is used to notify the communication between the base station of a serving cell and the terminal device has been restored.

Optionally, in the embodiment of the present application, the network device 500 is a satellite.

It should be understood that the network device 500 may correspond to the network device in the method 300, and may implement the corresponding operations of the network device in the method 300, which is not repeated here for brevity.

Figure 8:
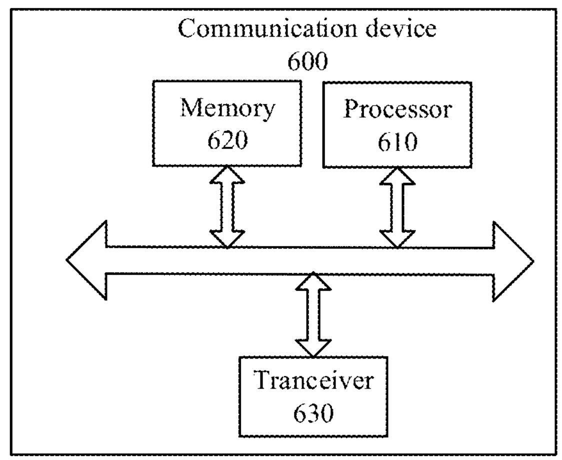
FIG. 8 is a schematic block diagram of a communication device according to an embodiment of the present application.

FIG. 8 is a schematic structural diagram of a communication device 600 provided by an embodiment of the present application. The communication device 600 shown in FIG. 8 includes a processor 610, and the processor 610 can call and run a computer program from a memory, so as to implement the methods in the embodiments of the present application.

Optionally, as shown in FIG. 8, the communication device 600 may further include a memory 620. The processor 610 may call and run a computer program from the memory 620 to implement the methods in the embodiments of the present application.

The memory 620 may be a separate device independent of the processor 610, or may be integrated in the processor 610.

Optionally, as shown in FIG. 8, the communication device 600 may further include a transceiver 630, and the processor 6710 may control the transceiver 630 to communicate with other device(s), specifically, may send information or data to other device(s), or receive other information or data sent by other device(s).

Among them, the transceiver 630 may include a transmitter and a receiver. The transceiver 630 may further include antennas, and the number of the antennas may be one or more.

Optionally, the communication device 600 may specifically be the network device in the embodiments of the present application, and the communication device 600 may implement the corresponding processes implemented by the network device in each method in the embodiments of the present application. For the sake of brevity, details are not repeated here.

Optionally, the communication device 600 may specifically be the terminal device in the embodiments of the present application, and the communication device 600 may implement the corresponding processes implemented by the terminal device in each method in the embodiments of the present application. For the sake of brevity, details are not repeated here.

Figure 9:
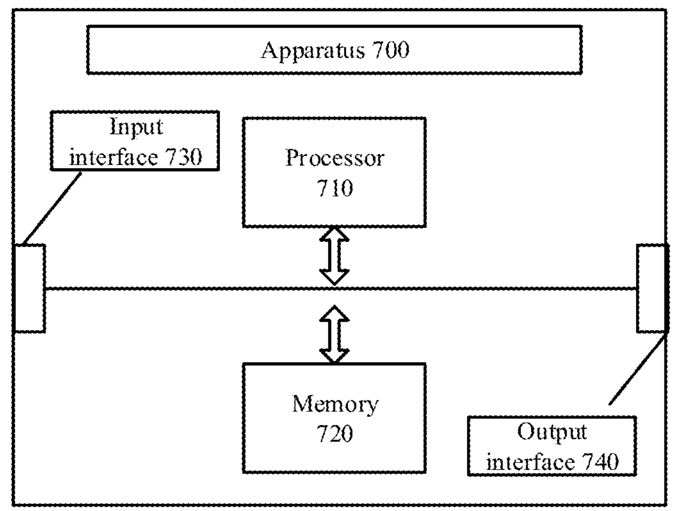
FIG. 9 is a schematic block diagram of an apparatus according to an embodiment of the present application.

FIG. 9 is a schematic structural diagram of an apparatus according to an embodiment of the present application. The apparatus 700 shown in FIG. 9 includes a processor 710, and the processor 710 can call and run a computer program from a memory, so as to implement the methods in the embodiments of the present application.

Optionally, as shown in FIG. 9, the apparatus 700 may further include a memory 720. The processor 710 may call and run a computer program from the memory 720 to implement the methods in the embodiments of the present application.

The memory 720 may be a separate device independent of the processor 710, or may be integrated in the processor 710.

Optionally, the apparatus 700 may further include an input interface 730. The processor 710 may control the input interface 730 to communicate with other device(s) or chip(s), and specifically, may acquire information or data sent by other device(s) or chip(s).

Optionally, the apparatus 700 may further include an output interface 740. The processor 710 may control the output interface 740 to communicate with other device(s) or chip(s), and specifically, may output information or data to other device(s) or chip(s).

Optionally, the apparatus may be applied to the terminal device in the embodiments of the present application, and the apparatus may implement the corresponding processes implemented by the terminal device in each method of the embodiments of the present application, which will not be repeated here for brevity.

Optionally, the apparatus may be applied to the network device in the embodiments of the present application, and the apparatus may implement the corresponding processes implemented by the network device in each method of the embodiments of the present application, which is not repeated here for brevity.

Optionally, the apparatus 700 may be a chip. It should be understood that the chip mentioned in the embodiments of the present application may also be referred to as a system-level chip, a system chip, a chip system, or a system-on-chip, or the like.

It should be understood that the processor in the embodiments of the present application may be an integrated circuit chip, which has a signal processing capability. In the implementation process, each step of the above method embodiments may be completed by a hardware integrated logic circuit in a processor or an instruction in the form of software. The above-mentioned processor may be a general-purpose processor, a Digital Signal Processor (DSP), an Application Specific Integrated Circuit (ASIC), a Field Programmable Gate Array (FPGA) or other programmable logic devices, discrete gates or transistor logic devices, discrete hardware components. The methods, steps, and logic block diagrams disclosed in the embodiments of the present application can be implemented or executed. The general-purpose processor may be a microprocessor or the processor may be any conventional processor or the like. The steps of the method disclosed in conjunction with the embodiments of the present application may be directly embodied as executed by a hardware decoding processor, or executed by a combination of hardware and software modules in the decoding processor. The software modules may be located in a random access memory, a flash memory, a read-only memory, a programmable read-only memory or an electrically erasable programmable memory, a register and other storage media mature in the art. The storage medium is located in the memory, and the processor reads the information in the memory, and completes the steps of the above methods in combination with its hardware.

It can be understood that the memory in the embodiments of the present application may be a volatile memory or a non-volatile memory, or may include both volatile and non-volatile memories. The non-volatile memory may be a Read-Only Memory (ROM), a Programmable Read-Only Memory (PROM), an Erasable Programmable Read-Only Memory (EPROM), an Erasable Programmable Read-Only Memory (EPROM), an Electrically EPROM (EEPROM) or a flash memory. The volatile memory may be a Random Access Memory (RAM), which acts as an external cache. By way of example and not limitation, many forms of RAM are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM)) and a Direct Rambus RAM (DR RAM). It should be noted that the memory of the systems and methods described herein is intended to include, but not be limited to, these and any other suitable types of memory.

It should be understood that the above-mentioned memories are examples but not a limitative description. For example, the memory in the embodiments of the present application may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM) and a Direct Rambus RAM (DR RAM) and so on. That is, the memory in the embodiments of the present application is intended to include but not limited to these and any other suitable types of memory.

Figure 10:
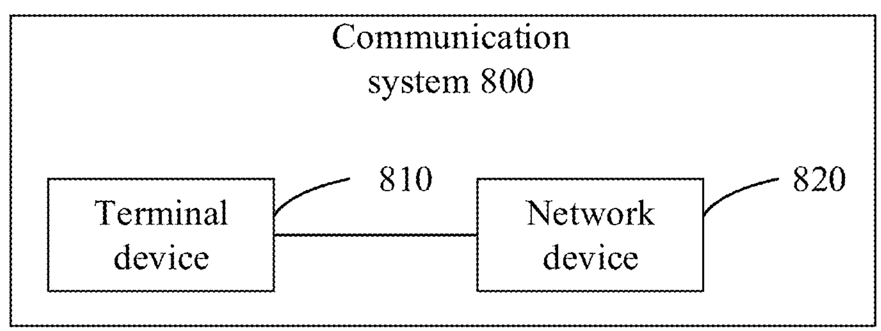
FIG. 10 is a schematic block diagram of a communication system according to an embodiment of the present application.

FIG. 10 is a schematic block diagram of a communication system 800 provided by an embodiment of the present application. As shown in FIG. 10, the communication system 800 includes a terminal device 810 and a network device 820.

The terminal device 810 may be used to implement the corresponding functions implemented by the terminal device in the above methods, and the network device 820 may be used to implement the corresponding functions implemented by the network device in the above methods. For brevity, details are not repeated here.

Embodiments of the present application further provide a computer-readable storage medium for storing a computer program.

Optionally, the computer-readable storage medium may be applied to the terminal device in the embodiments of the present application, and the computer program enables the computer to execute the corresponding processes implemented by the terminal device in each method of the embodiments of the present application. For brevity, details are not given here.

Optionally, the computer-readable storage medium may be applied to the network device in the embodiments of the present application, and the computer program enables the computer to execute the corresponding processes implemented by the network device in the various methods of the embodiments of the present application. For brevity, details are not given here.

Embodiments of the present application also provide a computer program product, including computer program instructions.

Optionally, the computer program product may be applied to the terminal device in the embodiments of the present application, and the computer program instructions cause the computer to execute the corresponding processes implemented by the terminal device in each method of the embodiments of the present application. For brevity, details are not given here.

Optionally, the computer program product may be applied to the network device in the embodiments of the present application, and the computer program instructions cause the computer to execute the corresponding processes implemented by the network device in each method of the embodiments of the present application. For brevity, details are not given here.

The embodiments of the present application also provide a computer program.

Optionally, the computer program may be applied to the terminal device in the embodiments of the present application. When the computer program runs on the computer, the computer executes the corresponding processes implemented by the terminal device in the various methods of the embodiments of the present application. For brevity, details are not given here.

Optionally, the computer program may be applied to the network device in the embodiments of the present application. When the computer program runs on the computer, it causes the computer to execute the corresponding processes implemented by the network device in each method of the embodiments of the present application. For brevity, details are not given here.

Those of ordinary skill in the art can realize that the units and algorithm steps of each example described in conjunction with the embodiments disclosed herein can be implemented in electronic hardware, or a combination of computer software and the electronic hardware. Whether these functions are performed in hardware or software depends on the specific application and design constraints of the technical solution. The person skilled in the art may implement the described functionality using different methods for each particular application, but such implementations should not be considered beyond the scope of the present application.

Those skilled in the art can clearly understand that, for the convenience and brevity of description, the specific working process of the above-described systems, apparatuses and units may refer to the corresponding processes in the foregoing method embodiments, which will not be repeated here.

In the several embodiments provided in the present application, it should be understood that the disclosed system, apparatus and method may be implemented in other manners. For example, the apparatus embodiments described above are only illustrative. For example, the division of the units is only a logical function division. In actual implementation, there may be other division methods. For example, multiple units or components may be combined or may be integrated into another system, or some features may be ignored, or not implemented. On the other hand, the shown or discussed mutual coupling or direct coupling or communication connection may be an indirect coupling or communication connection through some interfaces, apparatuses or units, and may be in electrical, mechanical or other forms.

The units described as separate components may or may not be physically separated, and components displayed as units may or may not be physical units, that is, they may be located in one place, or may be distributed to multiple network units. Some or all of the units may be selected according to actual needs to achieve the purpose of the solutions in the embodiments.

In addition, each functional unit in each embodiment of the present application may be integrated into one processing unit, or each unit may exist physically alone, or two or more units may be integrated into one unit.

The functions, if implemented in the form of software functional units and sold or used as independent products, may be stored in a computer-readable storage medium. Based on this understanding, the essence of the technical solutions of the present disclosure, or the part contributing to the related art, or the part of the technical solution may be embodied in the form of a software product. The computer software product is stored in a storage medium, including several instructions such that a computer device (which may be a personal computer, a server, or a network device, etc.) performs all or a part of steps of the methods described in each of the embodiments of the present application. The foregoing storage medium includes: any medium that is capable of storing program codes such as a U disk, a mobile hard disk, a Read-Only Memory (ROM), a Random Access Memory (RAM), a magnetic disk or an optical disk.

The above is only the specific embodiments of the present application, and the protection scope of the present application is not limited thereto. Any person skilled in the art can easily think of changes or replacements within the technical scope disclosed in the application, which shall be covered by the protection scope of the present application.

What is claimed is:

1. A method for cell measurement, comprising:

obtaining, by a terminal device, a target start time of a Synchronization signal Block Measurement Timing Configuration (SMTC) and/or a target start time of a measurement gap for a cell list; and measuring, by the terminal device, at least one cell in the cell list based on the target start time of the SMTC and/or the target start time of the measurement gap, wherein the obtaining, by the terminal device, the target start time of the SMTC and/or the target start time of the measurement gap for the cell list, comprises:

determining, by the terminal device, the cell list; and determining, by the terminal device, the target start time of the SMTC and/or the target start time of the measurement gap, wherein the determining, by the terminal device, the target start time of the SMTC and/or the target start time of the measurement gap, comprises:

determining, by the terminal device, a first difference, wherein the first difference is a difference between a signal transmission delay between the terminal device and a base station of a first cell and a signal transmission delay between the terminal device and a base station of a serving cell; and determining, by the terminal device, the target start time of the SMTC and/or the target start time of the measurement gap for measuring the first cell according to the first difference, wherein the cell list comprises the first cell, wherein the determining, by the terminal device, the target start time of the SMTC and/or the target start time of the measurement gap for measuring the first cell according to the first difference, comprises:

determining, by the terminal device, an offset according to the first difference; and determining, by the terminal device, the target start time of the measurement gap for measuring the first cell according to a basic start time of the measurement gap and the offset, and/or determining, by the terminal device, the target start time of the SMTC for measuring the first cell according to a basic start time of the SMTC and the offset, wherein one or more of the following:

the target start time of the measurement gap is a sum of the basic start time of the measurement gap and the offset;

the target start time of the SMTC is a sum of the basic start time of the SMTC and the offset.

2. The method according to claim 1, wherein the method comprises:

receiving, by the terminal device, Radio Resource Control (RRC) configuration measurement information sent by a network device, wherein the RRC configuration measurement information comprises the cell list, and comprises the target start time of the SMTC and/or a start time of the measurement gap; or the RRC configuration measurement information comprises the cell list, and comprises a target time of the SMTC and/or a target time of the measurement gap, wherein the RRC configuration measurement information indicates the target start time of the SMTC and/or the start time of the measurement gap to the terminal device by means of a pattern or a location bitmap; or the RRC configuration measurement information indicates the target time of the SMTC and/or the target time of the measurement gap to the terminal device by means of a pattern or a location bitmap.

3. The method according to claim 1, wherein the determining, by the terminal device, the offset according to the first difference, comprises:

determining, by the terminal device, a second difference according to a set of differences, wherein the set of differences comprises a difference between a first delay and a second delay, the first delay is at least one signal transmission delay between the terminal device and a base station of each neighboring cell in a set of cells, the second delay is a signal transmission delay between the terminal device and the base station of the serving cell, the set of cells belongs to the cell list, and the set of cells comprises the first cell; and determining, by the terminal device, the offset according to a functional relationship between the difference and the offset and according to the second difference, wherein the second difference is a minimum value in the set of differences.

4. The method according to claim 3, further comprising:

receiving, by the terminal device, RRC configuration measurement information sent by a network device, wherein the RRC configuration measurement information comprises the first difference or the second difference or the offset.

5. The method according to claim 3, further comprising:

receiving, by the terminal device, second information sent by a network device, wherein the second information is used to instruct the terminal device whether to determine at least one of following values: the first difference, the second difference and the offset.

6. The method according to claim 1, further comprising:

receiving, by the terminal device, first information sent by a network device, wherein the first information is used to instruct the terminal device to determine the target start time of the SMTC and/or the target start time of the measurement gap based on the offset.

7. The method according to claim 1, further comprising:

obtaining, by the terminal device, a target length of the SMTC and/or a target length of the measurement gap for the cell list;

the measuring, by the terminal device, the at least one cell in the cell list based on the target start time of the SMTC and/or the target start time of the measurement gap, comprises:

measuring, by the terminal device, at least one cell in the cell list based on the target start time and the target length of the SMTC, and/or based on the target start time and the target length of the measurement gap, further comprising:

receiving, by the terminal device, RRC configuration measurement information sent by a network device, wherein the RRC configuration measurement information comprises the cell list, and comprises the target length of the SMTC and/or the target length of the measurement gap, wherein the RRC configuration measurement information indicates the target length of the SMTC and/or the target length of the measurement gap to the terminal device by means of a pattern or a location bitmap.

8. The method according to claim 7, wherein the obtaining, by the terminal device, the target length of the SMTC and/or the target length of the measurement gap for the cell list, comprises:

determining, by the terminal device, the cell list;

determining, by the terminal device, the target length of the SMTC and/or the target length of the measurement gap based on the cell list, wherein the determining, by the terminal device, the target length of the SMTC and/or the target length of the measurement gap, comprises:

determining, by the terminal device, a fourth difference, wherein the fourth difference is a difference between a signal transmission delay between the terminal device and a base station of a first cell and a signal transmission delay between the terminal device and a base station of a serving cell; and determining, by the terminal device, a target length of the SMTC and/or a target length of the measurement gap for measuring the first cell according to the first fourth difference, wherein the cell list comprises the first cell, wherein the determining, by the terminal device, the target length of the SMTC and/or the target length of the measurement gap for measuring the first cell according to the fourth difference, comprises:

determining, by the terminal device, a first length according to the first fourth difference; and determining, by the terminal device, the target length of the measurement gap for measuring the first cell according to a basic length of the measurement gap and the first length, and/or determining, by the terminal device, the target length of the SMTC for measuring the first cell according to a basic length of the SMTC and the first length, wherein the target length of the measurement gap is a sum of the basic length of the measurement gap and the first length; and/or the target length of the SMTC is a sum of the basic length of the SMTC and the first length, wherein the determining, by the terminal device, the first length according to the first fourth difference, comprises:

determining, by the terminal device, a third difference according to a set of differences, wherein the set of differences comprises a difference between a first delay and a second delay, the first delay is at least one signal transmission delay between the terminal device and a base station of each neighboring cell in a set of cells, the second delay is a signal transmission delay between the terminal device and a base station of a serving cell, the set of cells belongs to the cell list, and the set of cells comprises the first cell; and determining, by the terminal device, the first length according to a functional relationship between the difference and the length and according to the third difference, wherein the third difference is a maximum value in the set of differences, wherein the method further comprises:

receiving, by the terminal device, RRC configuration measurement information sent by a network device, wherein the RRC configuration measurement information comprises the first fourth difference or the third difference or the first length, wherein the method further comprises:

receiving, by the terminal device, second information sent by a network device, wherein the second information is used to instruct the terminal device whether to determine at least one of following values: the fourth difference, the third difference and the first length, wherein the method further comprises:

receiving, by the terminal device, first information sent by a network device, wherein the first information is used to instruct the terminal device to determine the target length of the SMTC and/or the target length of the measurement gap based on the first length.

9. The method according to claim 1, further comprising:

receiving, by the terminal device, RRC configuration measurement information sent by a network device, wherein the RRC configuration measurement information comprises a shortest measurement time and/or a minimum number of measurements for the terminal device to measure at least one cell in the cell list; and when the measurement time for the terminal device to measure at least one cell in the cell list satisfies the shortest measurement time, and/or the number of measurements for the terminal device to measure at least one cell in the cell list satisfies the minimum number of measurements, stopping measuring, by the terminal device, at least one cell in the cell list, wherein when the measurement time for the terminal device to measure at least one cell in the cell list satisfies the shortest measurement time, and/or the number of measurements for the terminal device to measure at least one cell in the cell list satisfies the minimum number of measurements, the method further comprises:

sending, by the terminal device, third information to the network device, wherein the third information is used to notify that a communication between a serving cell and the terminal device has been resumed.

10. The method according to claim 1, wherein the method is applied in a Non-Terrestrial Network (NTN).

11. A method for cell measurement, comprising:

determining, by a network device, a target start time of a Synchronization signal Block Measurement Timing Configuration (SMTC) and/or a target start time of a measurement gap for a cell list; and sending, by the network device, Radio Resource Control (RRC) configuration measurement information to a terminal device, wherein the RRC measurement configuration information comprises the cell list, and comprises the target start time of the SMTC and/or a start time of the measurement gap, wherein the determining, by the network device, the target start time of the SMTC and/or the target start of the measurement gap for the cell list, comprises:

determining, by the network device, the target start time of the SMTC and/or the target start time of the measurement gap for the terminal device to measure a first cell according to a first difference, wherein the cell list comprises the first cell, the first difference is a difference between a signal transmission delay between the terminal device and a base station of the first cell and a signal transmission delay between the terminal device and a base station of a serving cell, wherein the determining, by the network device, the target start time of the SMTC and/or the target start time of the measurement gap for the terminal device to measure the first cell according to the first difference, comprises:

determining, by the network device, an offset according to the first difference; and determining, by the network device, the target start time of the measurement gap for measuring the first cell according to a basic start time of the measurement gap and the offset, and/or determining, by the terminal device, the target start time of the SMTC for measuring the first cell according to a basic start time of SMTC and the offset, wherein one or more of the following:

the target start time of the measurement gap is a sum of the basic start time of the measurement gap and the offset; and the target start time of the SMTC is a sum of the basic start time of the SMTC and the offset.

12. The method according to claim 11, wherein the RRC configuration measurement information comprises the cell list, and comprises a target time of the SMTC and/or a target time of the measurement gap.

13. The method according to claim 11, wherein the RRC configuration measurement information indicates to the terminal device the target start time of the SMTC and/or a start time of the measurement gap by means of a pattern or a location bitmap.

14. The method according to claim 11, wherein the determining, by the network device, the offset according to the first difference, comprises:

determining, by the network device, a second difference according to a set of differences, wherein the set of differences comprises a difference between a first delay and a second delay, the first delay is at least one signal transmission delay between the terminal device and a base station of each neighboring cell in a set of cells, the second delay is a signal transmission delay between the terminal device and the base station of the serving cell, the set of cells belongs to the cell list, and the set of cells comprises the first cell; and determining, by the network device, the offset according to a functional relationship between the difference and the offset and according to the second difference, wherein the second difference is a minimum value in the set of differences.

15. The method according to claim 11, further comprising:

determining, by the network device, a target length of the SMTC and/or a target length of the measurement gap for the cell list, wherein the RRC configuration measurement information comprises the target length of the SMTC and/or the target length of the measurement gap, wherein the RRC configuration measurement information indicates the target length of the SMTC and/or the target length of the measurement gap to the terminal device by means of a pattern or a location bitmap, wherein the determining, by the network device, the target length of the SMTC and/or the target length of the measurement gap for the cell list, comprises:

determining, by the network device, the target length of the SMTC and/or the target length of the measurement gap for the terminal device to measure a first cell according to a first fourth difference, wherein the cell list comprises the first cell, the fourth difference is a difference between a signal transmission delay between the terminal device and a base station of the first cell and a signal transmission delay between the terminal device and a base station of a serving cell, wherein the determining, by the network device, the target length of the SMTC and/or the target length of the measurement gap for the terminal device to measure the first cell according to the fourth difference, comprises:

determining, by the network device, a first length according to the fourth difference; and determining, by the network device, the target length of the measurement gap for measuring the first cell according to a basic length of the measurement gap and the first length, and/or determining, by the network device, the target length of the SMTC for measuring the first cell according to a basic length of the SMTC and the first length, wherein the target length of the measurement gap is a sum of the basic length of the measurement gap and the first length; and/or the target length of the SMTC is a sum of the basic length of the SMTC and the first length.

16. The method according to claim 15, wherein the determining, by the network device, the first length according to the fourth difference, comprises:

determining, by the network device, a third difference according to a set of differences, wherein the set of differences comprises a difference between a first delay and a second delay, the first delay is at least one signal transmission delay between the terminal device and a base station of each neighboring cell in a set of cells, the second delay is a signal transmission delay between the terminal device and the base station of the serving cell, the set of cells belongs to the cell list, and the set of cells comprises the first cell; and determining, by the network device, the first length according to a functional relationship between the difference and the length and according to the third difference, wherein the third difference is a maximum value in the set of differences.

17. The method according to claim 11, wherein the RRC configuration measurement information comprises a shortest measurement time and/or a minimum number of measurements for the terminal device to measure at least one cell in the cell list, the method further comprises:

receiving, by the network device, third information sent by the terminal device, wherein the third information is used to notify that a communication between a base station of a serving cell and the terminal device has been resumed.

18. The method according to claim 11, wherein the method is applied in a Non-Terrestrial Network (NTN).

19. A terminal device, comprising:

a processor and a memory, wherein the memory is used for storing a computer program, and the processor is used for calling and running the computer program stored in the memory, to:

obtain a target start time of a Synchronization signal Block Measurement Timing Configuration (SMTC) and/or a target start time of a measurement gap for a cell list; and measure at least one cell in the cell list based on the target start time of the SMTC and/or the target start time of the measurement gap;

determine the cell list;

determine the target start time of the SMTC and/or the target start time of the measurement gap;

determine a first difference, wherein the first difference is a difference between a signal transmission delay between the terminal device and a base station of a first cell and a signal transmission delay between the terminal device and a base station of a serving cell; and determine the target start time of the SMTC and/or the target start time of the measurement gap for measuring the first cell according to the first difference, wherein the cell list comprises the first cell;

determine an offset according to the first difference; and determine the target start time of the measurement gap for measuring the first cell according to a basic start time of the measurement gap and the offset, and/or determine the target start time of the SMTC for measuring the first cell according to a basic start time of the SMTC and the offset;

wherein one or more of the following:

the target start time of the measurement gap is a sum of the basic start time of the measurement gap and the offset; and the target start time of the SMTC is a sum of the basic start time of the SMTC and the offset.

* * * * *